United States Patent
Uemura et al.

(10) Patent No.: US 10,696,873 B2
(45) Date of Patent: Jun. 30, 2020

(54) ADHESIVE SHEET AND METHOD FOR PRODUCING ADHESIVE SHEET

(71) Applicant: LINTEC CORPORATION, Itabashi-ku (JP)

(72) Inventors: Kazue Uemura, Tsukubamirai (JP); Kaisuke Yanagimoto, Saitama (JP); Kiichiro Kato, Saitama (JP)

(73) Assignee: LINTEC CORPORATION, Itabashi-ku (JP)

( * ) Notice: Subject to any disclaimer, the term of this patent is extended or adjusted under 35 U.S.C. 154(b) by 90 days.

(21) Appl. No.: 15/763,365

(22) PCT Filed: Sep. 27, 2016

(86) PCT No.: PCT/JP2016/078531
§ 371 (c)(1),
(2) Date: Mar. 26, 2018

(87) PCT Pub. No.: WO2017/057406
PCT Pub. Date: Apr. 6, 2017

(65) Prior Publication Data
US 2018/0273810 A1    Sep. 27, 2018

(30) Foreign Application Priority Data
Sep. 28, 2015  (JP) .................... 2015-190524

(51) Int. Cl.
*C09J 9/00*     (2006.01)
*C09D 7/45*     (2018.01)
(Continued)

(52) U.S. Cl.
CPC ............... *C09J 9/00* (2013.01); *B32B 5/142* (2013.01); *B32B 7/12* (2013.01); *B32B 27/06* (2013.01);
(Continued)

(58) Field of Classification Search
CPC ..... C09J 9/00; C09J 7/385; C09J 7/255; C09J 7/401; C09J 5/00; C09J 11/04;
(Continued)

(56) References Cited

U.S. PATENT DOCUMENTS

| 5,650,215 A | 7/1997 | Mazurek et al. |
| 6,074,745 A | 6/2000 | Speeney |

(Continued)

FOREIGN PATENT DOCUMENTS

| JP | 7-19346 U | 4/1995 |
| JP | 11-115090 A | 4/1999 |

(Continued)

OTHER PUBLICATIONS

Extended European Search Report dated Mar. 8, 2019 in the corresponding European Application No. 16851577.3 8 pages.

(Continued)

*Primary Examiner* — Nathan L Van Sell
(74) *Attorney, Agent, or Firm* — Oblon, McClelland, Maier & Neustadt, L.L.P.

(57) ABSTRACT

Provided is a pressure sensitive adhesive sheet including a resin layer that is a multilayer structure containing at least a layer (Xβ), a layer (Y1), and a layer (Xα) laminated in this order, a surface (α) of the layer (Xα) of the resin layer having pressure sensitive adhesiveness, at least a constitutional component contained in the layer (Y1) being different from constitutional components contained in the layer (Xα) and the layer (Xβ), on the prescribed cross section (P1) of the pressure sensitive adhesive sheet, in a range of 250 μm in a horizontal direction freely-selected, a difference between a maximum value and a minimum value of the layer (Xα) being 3.00 μm or more, and a difference between a maximum value and a minimum value of the layer (Y1) being 5.00 μm or more.

16 Claims, 4 Drawing Sheets

(51) Int. Cl.
| | |
|---|---|
| *C09J 201/00* | (2006.01) |
| *B32B 27/26* | (2006.01) |
| *B32B 5/14* | (2006.01) |
| *C09J 7/38* | (2018.01) |
| *B32B 27/20* | (2006.01) |
| *B32B 7/12* | (2006.01) |
| *B32B 27/30* | (2006.01) |
| *B32B 27/10* | (2006.01) |
| *B32B 27/06* | (2006.01) |
| *B32B 27/08* | (2006.01) |
| *C09J 11/04* | (2006.01) |
| *C09J 7/25* | (2018.01) |
| *C09J 7/40* | (2018.01) |
| *C09J 5/00* | (2006.01) |
| *C08K 3/22* | (2006.01) |
| *C08K 3/36* | (2006.01) |

(52) U.S. Cl.
CPC .............. *B32B 27/08* (2013.01); *B32B 27/10* (2013.01); *B32B 27/20* (2013.01); *B32B 27/26* (2013.01); *B32B 27/308* (2013.01); *C09D 7/45* (2018.01); *C09J 5/00* (2013.01); *C09J 7/255* (2018.01); *C09J 7/38* (2018.01); *C09J 7/385* (2018.01); *C09J 7/401* (2018.01); *C09J 11/04* (2013.01); *C09J 201/00* (2013.01); *B32B 2255/10* (2013.01); *B32B 2255/12* (2013.01); *B32B 2255/26* (2013.01); *B32B 2264/102* (2013.01); *B32B 2307/732* (2013.01); *B32B 2307/748* (2013.01); *B32B 2405/00* (2013.01); *C08K 3/22* (2013.01); *C08K 3/36* (2013.01); *C09J 2205/102* (2013.01); *C09J 2205/114* (2013.01); *C09J 2400/10* (2013.01); *C09J 2433/00* (2013.01); *C09J 2467/006* (2013.01); *C09J 2483/005* (2013.01)

(58) Field of Classification Search
CPC ............ C09J 2205/102; C09J 2205/114; C09J 2400/10; C09J 2433/00; C09J 2467/006; C09J 2483/005; C09J 7/38; C09J 201/00; C09J 7/22; C09J 11/06; C09D 7/45; C08K 3/36; C08K 3/22; B32B 2255/10; B32B 2255/12; B32B 2255/26; B32B 2264/102; B32B 2307/732; B32B 2307/748; B32B 2405/00; B32B 5/142; B32B 7/12; B32B 27/06; B32B 27/08; B32B 27/10; B32B 27/20; B32B 27/26; B32B 27/308

See application file for complete search history.

(56) References Cited

U.S. PATENT DOCUMENTS

| | | | |
|---|---|---|---|
| 6,123,890 | A | 9/2000 | Mazurek et al. |
| 6,315,851 | B1 | 11/2001 | Mazurek et al. |
| 2014/0255679 | A1* | 9/2014 | Goeb .................... C09J 7/00 428/305.5 |

FOREIGN PATENT DOCUMENTS

| | | |
|---|---|---|
| JP | 2004-115766 A | 4/2004 |
| JP | 2005-298674 A | 10/2005 |
| JP | 2008-150431 A | 7/2008 |
| JP | 2009-35609 A | 2/2009 |
| JP | 2009-57432 A | 3/2009 |
| JP | 2012-197332 A | 10/2012 |

OTHER PUBLICATIONS

International Search Report dated Dec. 6, 2016 in PCT/JP2016/078531 filed Sep. 27, 2016.

* cited by examiner

ADHESIVE SHEET AND METHOD FOR PRODUCING ADHESIVE SHEET

TECHNICAL FIELD

The present invention relates to a pressure sensitive adhesive sheet and a method for producing a pressure sensitive adhesive sheet.

BACKGROUND ART

A general pressure sensitive adhesive sheet is constituted of a substrate, a pressure sensitive adhesive sheet formed on the substrate, and a release material provided on the pressure sensitive adhesive layer depending on necessity, and in use, after removing the release material in the case where the release material is provided, the general pressure sensitive adhesive sheet is attached to an adherend by bringing the pressure sensitive adhesive layer into contact therewith.

There are cases where the pressure sensitive adhesive layer of the pressure sensitive adhesive sheet is formed as a multilayer structure having two or more layers for the purposes of enhancing the pressure sensitive adhesive capability of the pressure sensitive adhesive sheet and imparting a particular function.

For example, PTL 1 describes a thermocompression bonding marking film having an adhesive layer having a two-layer structure containing a pressure sensitive adhesive layer formed of an acrylic pressure sensitive agent or a polyester pressure sensitive agent, and a surface treatment layer formed of a low melting point hot melt adhesive, for enabling adhesion to such an adherend as a fabric having been subjected to a water repellent treatment, and the like.

The thermocompression bonding marking film described in PTL 1 has the surface treatment layer formed of a low melting point hot melt adhesive, provided on the side of the adherend of the adhesive layer having a two-layer structure, and thus can be adhered to such an adherend as a fabric having been subjected to a water repellent treatment, and the like.

CITATION LIST

Patent Literature

PTL 1: JP 11-115090 A

SUMMARY OF INVENTION

Technical Problem

In general, in the case where a pressure sensitive adhesive layer of a pressure sensitive adhesive layer is a multilayer structure having two or more layers, as in the thermocompression bonding marking film described in PTL 1 or the like, there may be a problem that the interlayer adhesion (interface strength) between the two layers constituting the pressure sensitive adhesive layer in the form of a multilayer structure is deteriorated. Furthermore, there may also be a problem that the film strength of the pressure sensitive adhesive layer is deteriorated.

The present invention has been made in view of the aforementioned problem, and an object thereof is to provide a pressure sensitive adhesive sheet having a resin layer in the form of a multilayer structure that has an excellent pressure sensitive adhesive strength and is good in interlayer adhesion, and a method for producing the pressure sensitive adhesive sheet.

Solution to Problem

The present inventors have found that the problem can be solved by a pressure sensitive adhesive sheet having a resin layer that is a multilayer structure containing at least a layer (Xβ), a layer (Y1), and a layer (Xα) laminated in this order, the layer (Xα) having a surface having pressure sensitive adhesiveness, in which the difference between the maximum value and the minimum value of the thickness of the layer (Xα) and the difference between the maximum value and the minimum value of the thickness of the layer (Y1) are controlled to particular values or more, the thicknesses thereof being measured from predetermined cross sections of the resin layer.

Specifically, the present invention provides the following items [1] to [15].

[1] A pressure sensitive adhesive sheet including, on a substrate or a release material, a resin layer that is a multilayer structure containing at least a layer (Xβ), a layer (Y1), and a layer (Xα) laminated in this order, at least a surface (α) of the layer (Xα) of the resin layer having pressure sensitive adhesiveness, wherein at least a constitutional component contained in the layer (Y1) is different from a constitutional component contained in the layer (Xα) and a constitutional component contained in the layer (Xβ), in at least one cross section (P1) of two cross sections of the pressure sensitive adhesive sheet resulting from freely-selecting a region (P) surrounded by a square having an edge length of 5 mm on the surface (α) and cutting the region (P) in the thickness direction with a plane surface going through each of two diagonal lines of the square and being perpendicular to the region (P) on the surface (α), thicknesses of the layer (Xα) and the layer (Y1) in a range of 250 μm in a horizontal direction freely-selected on the cross section (P1) satisfy the following requirements (Xα-I) and (Y1-I):

requirement (Xα-I): a difference $[H_{MAX}(X\alpha)-H_{MIN}(X\alpha)]$ between a maximum value ($H_{MAX}(X\alpha)$) of the thickness of the layer (Xα) and a minimum value ($H_{MIN}(X\alpha)$) of the thickness of the layer (Xα) is 3.00 μm or more, and requirement (Y1-I): a difference $[H_{MAX}(Y1)-H_{MIN}(Y1)]$ between a maximum value ($H_{MAX}(Y1)$) of the thickness of the layer (Y1) and a minimum value ($H_{MIN}(Y1)$) of the thickness of the layer (Y1) is 5.00 μm or more.

[2] The pressure sensitive adhesive sheet according to the item [1], wherein the resin layer contains a resin part (X) containing a resin and a particle part (Y) consisting of particles, the layer (Xβ) mainly contains the resin part (X), the layer (Y1) contains the particle part (Y), and the layer (Xα) mainly contains the resin part (X).

[3] The pressure sensitive adhesive sheet according to the item [1] or [2], wherein thicknesses of the layer (Xα) and the layer (Y1) in a range of 250 μm in a horizontal direction freely-selected on the cross section (P1) further satisfy the following requirements (Xα-II) and (Y1-II):

requirement (Xα-II): a standard deviation of the thickness of the layer (Xα) with respect to an average value is 1.00 or more, and requirement (Y1-II): a standard deviation of the thickness of the layer (Y1) with respect to an average value is 2.00 or more.

[4] The pressure sensitive adhesive sheet according to any one of the items [1] to [3], wherein a thickness of the layer (Xβ) in a range of 250 μm in a horizontal direction freely-selected on the cross section (P1) satisfies the following requirement (Xβ-I):

requirement (Xβ-I): a difference $[H_{MAX}(Xβ)-H_{MIN}(Xβ)]$ between a maximum value ($H_{MAX}(Xβ)$) of the thickness of the layer (Xβ) and a minimum value ($H_{MIN}(Xβ)$) of the thickness of the layer (Xβ) is 3.00 μm or more.

[5] The pressure sensitive adhesive sheet according to any one of the items [1] to [4], wherein a thickness of the layer (Xβ) in a range of 250 μm in a horizontal direction freely-selected on the cross section (P1) satisfies the following requirement (Xβ-II):

requirement (Xβ-II): a standard deviation of the thickness of the layer (Xβ) with respect to an average value is 1.00 or more.

[6] The pressure sensitive adhesive sheet according to any one of the items [1] to [5], wherein in a graph showing a thickness of the layer (Y1) at positions with a horizontal distance being made to vary from 0 μm to 250 μm in a range of 250 μm in a horizontal direction freely-selected on the cross section (P1), assuming that an arithmetic average value of the thickness of the layer (Y1) in the range is Ra (μm), at least one range in a horizontal direction including a maximum value (Q) satisfying the following requirement (III) exists:

requirement (III): in the graph, a range in a horizontal direction has a value of the thickness of the layer (Y1) at positions with a horizontal distance being made to vary from 0 μm to 250 μm that exceeds Ra (μm), subsequently exceeds Ra+3 (μm) to reach the maximum value (Q), then underruns Ra+3 (μm), and further underruns Ra (μm).

[7] The pressure sensitive adhesive sheet according to any one of the items [1] to [6], wherein in a range of 250 μm in a horizontal direction freely-selected on the cross section (P1), a concave portion exists on the surface (α) of the layer (Xα) laminated vertically above a position in the layer (Y1), at which the thickness of the layer (Y1) is the minimum value ($H_{MIN}(Y1)$).

[8] The pressure sensitive adhesive sheet according to any one of the items [2] to [7], wherein a mass retention rate after heating the resin layer at 800° C. for 30 minutes is 3 to 90% by mass.

[9] The pressure sensitive adhesive sheet according to any one of the items [2] to [8], wherein the resin contained in the resin part (X) contains a pressure sensitive adhesive resin.

[10] The pressure sensitive adhesive sheet according to any one of the items [2] to [9], wherein the resin part (X) further contains at least one selected from a metal chelate crosslinking agent and an epoxy crosslinking agent.

[11] The pressure sensitive adhesive sheet according to any one of the items [2] to [10], wherein the fine particles are at least one selected from silica particles, metal oxide particles, and smectite.

[12] The pressure sensitive adhesive sheet according to any one of the items [1] to [11], wherein a surface (β) of the resin layer on the side on which the substrate or the release material is provided has pressure sensitive adhesiveness.

[13] The pressure sensitive adhesive sheet according to any one of the items [1] to [12], wherein the layer (Xβ) is a layer formed by a composition (xβ) containing a resin and having a content of fine particles of less than 15% by mass, the layer (Y1) is a layer formed by a composition (y) containing fine particles in an amount of 15% by mass or more, and the layer (Xα) is a layer formed by a composition (xα) containing a resin and having a content of fine particles of less than 15% by mass.

[14] A method for producing the pressure sensitive adhesive sheet as set forth in any one of the items [1] to [13], which includes the following steps (1A) and (2A):

step (1A): a step of forming, on the substrate or the release material, a coating film (xβ') formed by a composition (xβ) containing a resin and having a content of the fine particles of less than 15% by mass, a coating film (y') formed by a composition (y) containing fine particles in an amount of 15% by mass or more, and a coating film (xα') formed by a composition (xα) containing a resin and having a content of the fine particles of less than 15% by mass, by laminating in this order; and step (2A): a step of simultaneously drying the coating film (xβ'), the coating film (y'), and the coating film (xα') formed in the step (1A).

[15] A method for producing the pressure sensitive adhesive sheet as set forth in any one of the items [1] to [13], which includes the following steps (1B) and (2B):

step (1B): a step of forming, on a layer (Xβ) mainly containing the resin part (X) that is provided on the substrate or the release material, a coating film (y') formed by a composition (y) containing fine particles in an amount of 15% by mass or more, and a coating film (xα') formed by a composition (xα) containing the resin and having a content of the fine particles of less than 15% by mass, by laminating in this order; and step (2B): a step of simultaneously drying the coating film (y') and the coating film (xα') formed in the step (1B).

Advantageous Effects of Invention

The pressure sensitive adhesive sheet of the present invention has a resin layer having an excellent pressure sensitive adhesive strength and being in the form of a multilayer structure, and the multilayer structure is also good in interlayer adhesion.

DESCRIPTION OF EMBODIMENTS

Figure 1:
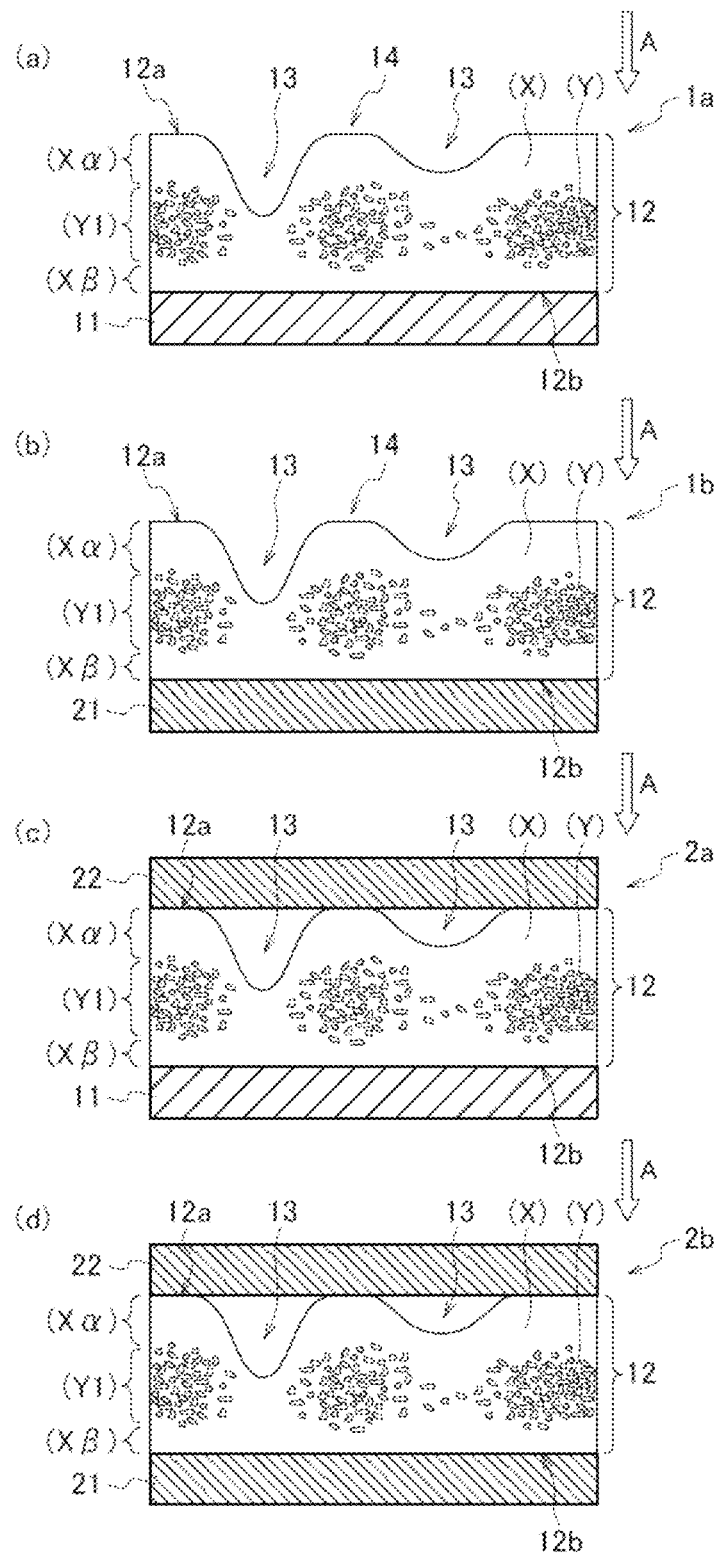
FIG. 1 is a schematic cross sectional view showing an example of the structure of the pressure sensitive adhesive sheet of the present invention.

In the present invention, for example, an expression "YY containing a component XX as a main component" or an expression "YY mainly containing a component XX" means that "among the components contained in YY, a component having a largest content is the component XX". A specific content of the component XX in this expression is typically 50% by mass or more, and is preferably 65 to 100% by mass, more preferably 75 to 100% by mass, and still more preferably 85 to 100% by mass relative to the total amount (100% by mass) of YY.

In the present invention, for example, "(meth)acrylic acid" indicates both "acrylic acid" and "methacrylic acid", and the same is also applicable to other analogous terms.

Regarding a preferred numerical range (for example, a range of content or the like), a lower limit and an upper limit that are expressed in stages can be combined each independently. For example, from an expression of "preferably 10 to 90, and more preferably 30 to 60", "the preferred lower limit (10)" and "the more preferred upper limit (60)" may be combined to be "10 to 60".

[Configuration of Pressure Sensitive Adhesive Sheet of Present Invention]

The pressure sensitive adhesive sheet of the present invention includes, on a substrate or a release material, a resin layer that is a multilayer structure containing at least a layer (Xβ), a layer (Y1), and a layer (Xα) laminated in this order, and at least a surface (α) of the layer (Xα) of the resin layer has pressure sensitive adhesiveness.

FIG. 1 is a schematic cross sectional view showing an example of the structure of the pressure sensitive adhesive sheet of the present invention.

Examples of the pressure sensitive adhesive sheet of an embodiment of the present invention include a pressure sensitive adhesive sheet 1a having a resin layer 12 on a substrate 11 as shown in FIG. 1(a), and a pressure sensitive adhesive sheet 1b having a resin layer 12 on a release material 21 as shown in FIG. 1(b).

In the pressure sensitive adhesive sheet of the present invention, at least a surface (α) 12a of the layer (Xα) of the resin layer 12 has pressure sensitive adhesiveness.

Accordingly, from the viewpoint of handleability, the pressure sensitive adhesive sheet of another embodiment of the present invention preferably has a configuration of a pressure sensitive adhesive sheet 2a or 2b as shown in FIG. 1(c) or FIG. 1(d), in which a release material 22 is further provided on the surface (α) 12a of the layer (Xα) of the resin layer 12 in the pressure sensitive adhesive sheet 1a or 1b as shown in FIG. 1.

In the pressure sensitive adhesive sheet of an embodiment of the present invention, a surface (β) 12b of the layer (Xβ) of the resin layer 12 on the side having the substrate 11 or the release material 21 provided may also have pressure sensitive adhesiveness.

When the surface (β) also has pressure sensitive adhesiveness, the adhesiveness between the resin layer 12 and the substrate 11 can be good for the pressure sensitive adhesive sheets 1a and 2a shown in FIGS. 1(a) and 1(c), and a double-sided pressure sensitive adhesive sheet can be provided for the pressure sensitive adhesive sheets 1b and 2b shown in FIGS. 1(b) and 1(d).

In the pressure sensitive adhesive sheet of an embodiment of the present invention, such as the pressure sensitive adhesive sheet 1a shown in FIG. 1, a concave portion 13 and a flat face 14 preferably exist on the surface (α) of the resin layer 12.

The concave portion 13 existing on the surface (α) plays a role of air-discharge channel for drawing the "air accumulation" out to be formed in attaching the surface (α) of the resin layer of the pressure sensitive adhesive sheet of the present invention to an adherend. Accordingly, the pressure sensitive adhesive sheet having the concave portion 13 existing on the surface (α) has excellent air escape property.

The flat face 14 existing on the surface (α) of the resin layer is a face coming into direct contact with the adherend and adhering closely thereto in attaching to the adherend and is a site influencing the pressure sensitive adhesive strength of the pressure sensitive adhesive sheet.

In the pressure sensitive adhesive sheet of the present invention, at least a constitutional component contained in the layer (Y1) is different from a constitutional component contained in the layer (Xα) and a constitutional component contained in the layer (Xβ).

While depending on the materials forming the layers constituting the multilayer structure, in the case where the materials forming two layers that are in contact with each other are different from each other, the interlayer adhesion between the two layers generally tends to decrease.

In the pressure sensitive adhesive sheet of the present invention, on the other hand, the difference between the maximum value and the minimum value of the thickness of the layer (Xα) and the difference between the maximum value and the minimum value of the thickness of the layer (Y1) are controlled to particular values or more, and therefore the thicknesses of the layer (Xα) and the layer (Y1) are non-uniform. Furthermore, assuming that the thickness of the resin layer is uniform, the thickness of the layer (Xβ) is also non-uniform when the thicknesses of the layer (Xα) and the layer (Y1) are non-uniform.

According thereto, even though the resin layer is a multilayer structure, in which the materials forming the two layers in contact with each other are different from each other, the interlayer adhesion between the adjacent two layers is excellent.

Specifically, in at least one cross section (P1) of two cross sections of the pressure sensitive adhesive sheet resulting from freely-selecting a region (P) surrounded by a square having an edge length of 5 mm on the surface (α) and cutting the region (P) in the thickness direction with a plane surface going through each of two diagonal lines of the square and being perpendicular to the region (P) on the surface (α), thicknesses of the layer (Xα) and the layer (Y1) in a range of 250 μm in a horizontal direction freely-selected on the cross section (P1) satisfy the following requirements (Xα-I) and (Y1-I).

Requirement (Xα-I): A difference $[H_{MAX}(X\alpha)-H_{MIN}(X\alpha)]$ between a maximum value ($H_{MAX}(X\alpha)$) of the thickness of the layer (Xα) and a minimum value ($H_{MIN}(X\alpha)$) of the thickness of the layer (Xα) is 3.00 μm or more.

Requirement (Y1-I): A difference $[H_{MAX}(Y1)-H_{MIN}(Y1)]$ between a maximum value ($H_{MAX}(Y1)$) of the thickness of the layer (Y1) and a minimum value ($H_{MIN}(Y1)$) of the thickness of the layer (Y1) is 5.00 μm or more.

The pressure sensitive adhesive sheet of the present invention satisfies the requirements (Xα-I) and (Y1-I), and therefore even though the resin layer is a multilayer structure, in which the materials forming the two layers in contact with each other are different from each other, the interlayer adhesion between the adjacent two layers is excellent. Furthermore, the film strength of the resin layer formed can be made excellent.

<Method for Selecting Cross Sections of Pressure Sensitive Adhesive Sheet>

The workflow until the "two cross sections of the pressure sensitive adhesive sheet" are obtained will be described with reference to FIG. 2.

Figure 2:
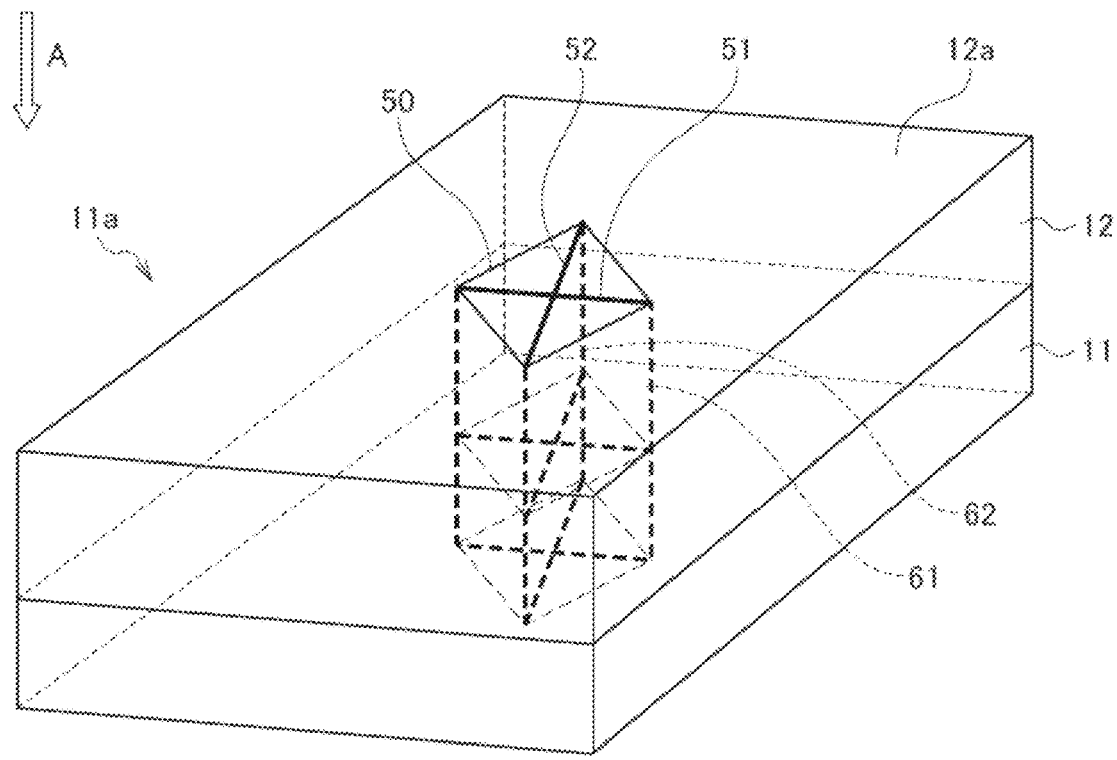
FIG. 2 is an illustration for describing a method for obtaining the "two cross sections of the pressure sensitive adhesive sheet" defined in the present invention, and is a perspective view of the pressure sensitive adhesive sheet of one embodiment of the present invention.

FIG. 2 is an illustration for describing a method for obtaining the "two cross sections of the pressure sensitive adhesive sheet" defined in the present invention, and is a perspective view of the pressure sensitive adhesive sheet of one embodiment of the present invention. FIG. 2 shows, as an example, a perspective view of a pressure sensitive adhesive sheet 11a having a resin layer 12 on a substrate 11.

On the surface ($\alpha$) 12a of the resin layer 12 of the pressure sensitive adhesive sheet of the present invention, a concave portion and a flat face may exist, but are omitted from being shown in FIG. 2.

Firstly, a region (P) surrounded by a square 50 having an edge length of 5 mm is freely-selected on the surface ($\alpha$) 12a of the resin layer 12. At this time, for the region (P) to be selected, there is no limitation in the selecting position thereof on the surface ($\alpha$) 12a, the direction of the square 50 constituting the selected region (P), and the like.

Then, the pressure sensitive adhesive sheet is cut in the thickness direction with planar surfaces that pass through two diagonal lines 51 and 52 of the square 50 constituting the region (P) respectively and are perpendicular to the surface ($\alpha$) 12a, and thereby two cross sections 61 and 62 are obtained.

Specifically, in the case where the pressure sensitive adhesive sheet is cut in the thickness direction A with the planar surface that passes through the diagonal line 51 and is perpendicular to the surface ($\alpha$) 12a, the cross section 61 is obtained.

In the case where the pressure sensitive adhesive sheet is cut in the thickness direction A with the planar surface that passes through the diagonal line 52 and is perpendicular to the surface ($\alpha$) 12a, the cross section 62 is obtained.

In the present invention, on at least one cross section of two cross sections 61 and 62 of the pressure sensitive adhesive sheet, the thicknesses of the layer (X$\alpha$) and the layer (Y1) in a range of 250 μm in a horizontal direction freely-selected thereon necessarily satisfy the requirements (X$\alpha$-I) and (Y1-I).

In the description herein, among the two cross sections 61 and 62 obtained above, the cross section that satisfies the requirements (X$\alpha$-I) and (Y1-I) is referred to as a "cross section (P1)".

Figure 3:
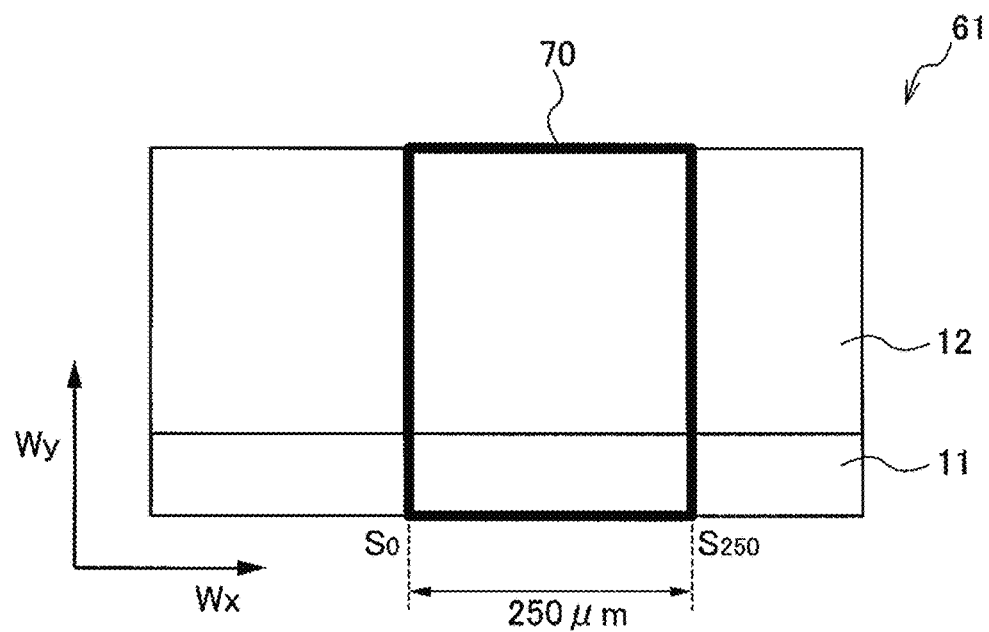
FIG. 3 is an illustration for describing, taking the cross section 61 shown in FIG. 2 as an example, a method for selecting the "range of 250 μm in a horizontal direction" from the cross section 61.

FIG. 3 is an illustration for describing, taking the cross section 61 shown in FIG. 2 as an example, a method for selecting the "range of 250 μm in a horizontal direction" from the cross section 61.

In the present invention, as shown in FIG. 3, on the selected cross section, the direction in parallel to the boundary line between the substrate or the release material and the resin layer 12 is designated as a "horizontal direction Wx", and the direction perpendicular to the horizontal direction Wx is designated as a "vertical direction Wy". The vertical direction Wy agrees with the thickness direction of the pressure sensitive adhesive sheet.

On the cross section 61 shown in FIG. 3, a "width of 250 μm in the horizontal direction" with a distance between the start point S0 and the end point S250 of 250 μm is freely-selected, and thereby a range 70 of the cross section including the width of 250 μm in the horizontal direction becomes the "range of 250 μm in a horizontal direction".

In the present invention, the judgement as to whether or not the two cross sections 61 and 62 correspond to the cross section (P1) satisfying the requirements (X$\alpha$-I) and (Y1-I) and the judgement as to whether or not the cross section (P1) satisfies the requirements described later may be performed based on an image acquired from the target cross section with a scanning electron microscope (magnification: 100 to 1,000).

<Requirement (X$\alpha$-I), Requirement (Y1-I), and Requirement (X$\beta$-I)>

Figure 4:
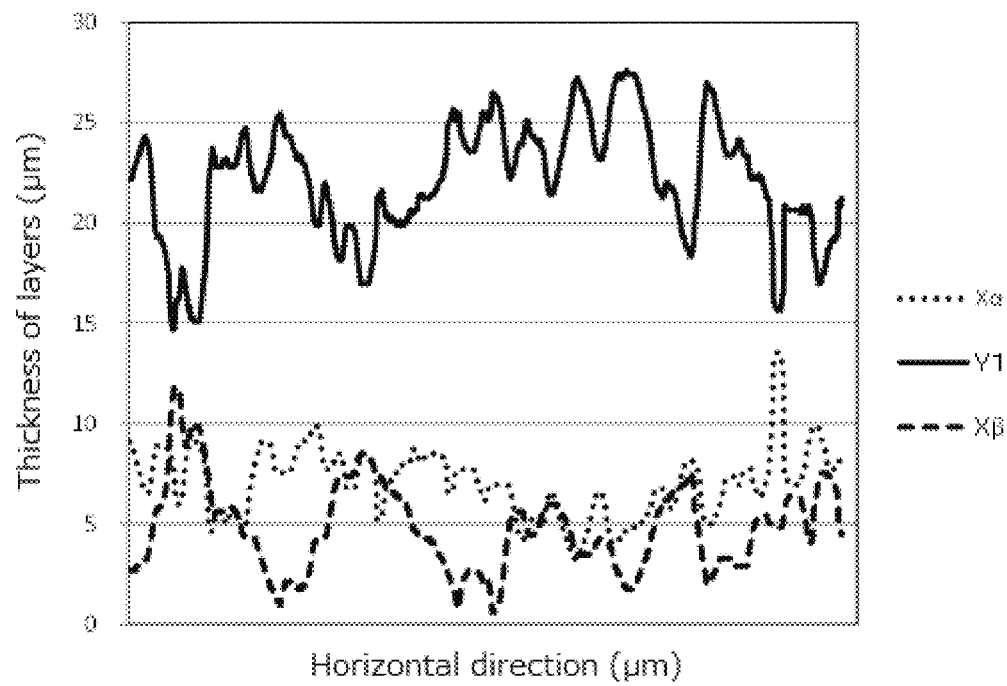
FIG. 4 is a graph showing the thicknesses of the layer (Xα), the layer (Y1), and the layer (Xβ) at positions with a horizontal distance being made to vary from 0 μm to 250 μm in a range of 250 μm in a horizontal direction freely-selected on the cross section (P1) of the resin layer of the pressure sensitive adhesive sheet produced in Example 1, which is one embodiment of the present invention.

FIG. 4 is a graph showing the thicknesses of the layer (X$\alpha$), the layer (Y1), and the layer (X$\beta$) at positions with a horizontal distance being made to vary from 0 μm to 250 μm in a range of 250 μm in a horizontal direction freely-selected on the cross section (P1) of the resin layer of the pressure sensitive adhesive sheet produced in Example 1, which is one embodiment of the present invention.

The expression "a horizontal distance being made to vary from 0 μm to 250 μm in a range of 250 μm in a horizontal direction freely-selected" means that the horizontal distance is made to vary from the start point S0 to the end point S250 shown in FIG. 3 along the horizontal direction.

It is understood from the graph shown in FIG. 4 that in the pressure sensitive adhesive sheet of the present invention, all the thicknesses of the layer (X$\alpha$), the layer (Y1), and the layer (X$\beta$) are not uniform but are non-uniform in the horizontal direction, and in particular, the differences between the maximum value and the minimum value of the thickness of each of the layers are large.

The present invention defines in the requirement (X$\alpha$-I) that the difference [$H_{MAX}(X\alpha)-H_{MIN}(X\alpha)$] between the maximum value ($H_{MIN}(X\alpha)$) of the thickness of the layer (X$\alpha$) and the minimum value ($H_{MIN}(X\alpha)$) of the thickness of the layer (X$\alpha$) is 3.00 μm or more.

The present invention also defines in the requirement (Y1-I) that the difference [$H_{MAX}(Y1)-H_{MIN}(Y1)$] between the maximum value ($H_{MAX}(Y1)$) of the thickness of the layer (Y1) and the minimum value ($H_{MIN}(Y1)$) of the thickness of the layer (Y1) is 5.00 μm or more.

When the difference between the maximum value and the minimum value of the thickness of the layer (X$\alpha$) is less than 3.00 μm, the interlayer adhesion between the layer (Y1) and the layer (X$\alpha$) may be deteriorated to separate the layer (Y1) and the layer (X$\alpha$) from each other in some cases.

When the difference between the maximum value and the minimum value of the thickness of the layer (Y1) is less than 5.00 μm, not only the interlayer adhesion between the layer (Y1) and the layer (X$\alpha$) may be deteriorated, but also the interlayer adhesion between the layer (Y1) and the layer (X$\beta$) may be similarly deteriorated.

Furthermore, by satisfying both the requirements (X$\alpha$-I) and (Y1-I), such a resin layer can be formed that not only the interlayer adhesion among the layers is enhanced, but also the film strength and the pressure sensitive adhesive strength are enhanced.

For example, in the case where the layer (Y1) is a layer containing a particle part (Y), there is a tendency that the film strength is enhanced with a larger thickness of the layer (Y1), and there is a tendency that the pressure sensitive adhesive strength is enhanced with a larger thickness of the layer (X$\alpha$) having the surface ($\alpha$) having pressure sensitive adhesiveness.

In this case, when the differences between the maximum value and the minimum value of the thickness of each of the layer (X$\alpha$) and the layer (Y1) are the certain values or more to satisfy the requirements (Xα-I) and (Y1-I), a pressure sensitive adhesive sheet that is excellent in balance between the film strength and the pressure sensitive adhesive strength is obtained since such a resin layer is formed that portions that are particularly excellent in film strength and portions that are particularly excellent in pressure sensitive adhesive strength are widely distributed.

From the aforementioned viewpoint, the difference [$H_{MAX}(X\alpha)-H_{MIN}(X\alpha)$] between the maximum value and the minimum value of the thickness of the layer (Xα) defined in the requirement (Xα-I) is 3.00 μm or more, preferably 4.00 μm or more, more preferably 5.00 μm or more, further preferably 6.00 μm or more, and still further preferably 8.00 μm or more, and is preferably 80 μm or less, more preferably 40 μm or less, further preferably 30 μm or less, and still further preferably 25 μm or less.

From the aforementioned viewpoint, the difference [$H_{MAX}(Y1)-H_{MIN}(Y1)$] between the maximum value and the minimum value of the thickness of the layer (Y1) defined in the requirement (Y1-I) is 5.00 μm or more, preferably 7.00 μm or more, more preferably 9.00 μm or more, further preferably 10.50 μm or more, and still further preferably 12.00 μm or more, and is preferably 100 μm or less, more preferably 50 μm or less, further preferably 40 μm or less, and still further preferably 30 μm or less.

In the pressure sensitive adhesive sheet of one embodiment of the present invention, the thickness of the layer (Xβ) in a range of 250 μm in the horizontal direction freely-selected on the cross section (P1) preferably satisfies the following requirement (Xβ-I).

Requirement (Xβ-I): A difference [$H_{MAX}(X\beta)-H_{MIN}(X\beta)$] between a maximum value ($H_{MAX}(X\beta)$) of the thickness of the layer (Xβ) and a minimum value ($H_{MIN}(X\beta)$) of the thickness of the layer (Xβ) is 3.00 μm or more.

When the difference between the maximum value and the minimum value of the thickness of the layer (Xβ) is 3.00 μm or more as defined in the requirement (Xβ-I), the interlayer adhesion between the layer (Y1) and the layer (Xβ) can be improved.

In the case where the layer (Y1) is a layer containing a particle part (Y), the film strength can be improved since the thickness of the layer (Y1) is large at a position where the thickness of the layer (Xβ) is around the minimum value.

In the case where the layer (Xβ) is a layer containing a pressure sensitive adhesive resin, excellent pressure sensitive adhesiveness can be readily exhibited at a position where the thickness of the layer (Xβ) is around the maximum value. Accordingly, in an embodiment of a pressure sensitive adhesive sheet having a substrate, the pressure sensitive adhesive sheet can be further excellent in adhesiveness to the substrate, and in an embodiment of a pressure sensitive adhesive sheet having no substrate, the pressure sensitive adhesive sheet can be excellent in pressure sensitive adhesive strength.

From the aforementioned viewpoint, the difference [$H_{MAX}(X\beta)-H_{MIN}(X\beta)$] between the maximum value and the minimum value of the thickness of the layer (Xβ) defined in the requirement (Xβ-I) is 3.00 μm or more, preferably 4.00 μm or more, more preferably 5.00 μm or more, further preferably 6.00 μm or more, and still further preferably 8.00 μm or more, and is preferably 80 μm or less, more preferably 40 μm or less, further preferably 30 μm or less, and still further preferably 25 μm or less.

<Requirements (Xα-II), (Y1-II), and (Xβ-II)>

In the pressure sensitive adhesive sheet of one embodiment of the present invention, the thicknesses of the layer (Xα) and the layer (Y1) in a range of 250 μm in a horizontal direction freely-selected on the cross section (P1) preferably satisfy the following requirements (Xα-II) and (Y1-II), and it is more preferred that the requirements (Xα-II) and (Y1-II) are satisfied, and the thickness of the layer (Xβ) satisfies the following requirement (Xβ-II).

Requirement (Xα-II): The standard deviation of the thickness of the layer (Xα) with respect to the average value is 1.00 or more.

Requirement (Y1-II): The standard deviation of the thickness of the layer (Y1) with respect to the average value is 2.00 or more.

Requirement (Xβ-II): The standard deviation of the thickness of the layer (Xβ) with respect to the average value is 1.00 or more.

The requirements (Xα-II), (Y1-II), and (Xβ-II) each show that the distribution of the value of the thickness of the layer with respect to the average thickness of the layer is wide.

When the standard deviation of the thickness of the layer with respect to the average value is larger, i.e., when the distribution of the value of the thickness of the layer is wider, the interlayer adhesion between the adjacent two layers can be enhanced, and the resin layer can have positions excellent in film density and positions exhibiting excellent pressure sensitive adhesiveness that are uniformly distributed.

Accordingly, the pressure sensitive adhesive sheet that satisfies the requirements can be further excellent in interlayer adhesion and can be further excellent in balance between the film strength and the pressure sensitive adhesive strength.

From the aforementioned viewpoint, the standard deviation of the thickness of the layer (Xα) with respect to the average value defined in the requirement (Xα-II) is 1.00 or more, preferably 1.20 or more, more preferably 1.35 or more, further preferably 1.50 or more, and still further preferably 1.65 or more, and is preferably 10.00 or less, more preferably 8.00 or less, and further preferably 5.00 or less.

From the aforementioned viewpoint, the standard deviation of the thickness of the layer (Y1) with respect to the average value defined in the requirement (Y1-II) is 2.00 or more, preferably 2.30 or more, more preferably 2.50 or more, further preferably 2.70 or more, and still further preferably 2.85 or more, and is preferably 10.00 or less, more preferably 8.00 or less, and further preferably 6.00 or less.

From the aforementioned viewpoint, the standard deviation of the thickness of the layer (Xβ) with respect to the average value defined in the requirement (Xβ-II) is 1.00 or more, preferably 1.20 or more, more preferably 1.35 or more, further preferably 1.50 or more, and still further preferably 1.65 or more, and is preferably 10.00 or less, more preferably 8.00 or less, and further preferably 5.00 or less.

<Maximum Value (Q) Satisfying Requirement (III)>

In the pressure sensitive adhesive sheet of one embodiment of the present invention, in a graph showing the thickness of the layer (Y1) at positions with a horizontal distance being made to vary from 0 μm to 250 μm in a range of 250 μm in the horizontal direction freely-selected on the cross section (P1), assuming that an arithmetic average value of the thickness of the layer (Y1) in the range is Ra (μm), at least one range in the horizontal direction including a maximum value (Q) satisfying the following requirement (III) exists.

Requirement (III): in the graph, the range in a horizontal direction has a value of the thickness of the layer (Y1) at positions with a horizontal distance being made to vary from 0 μm to 250 μm that exceeds Ra (μm), subsequently exceeds Ra+3 (μm) to reach the maximum value (Q), then underruns Ra+3 (μm), and further underruns Ra (μm).

Figure 5:
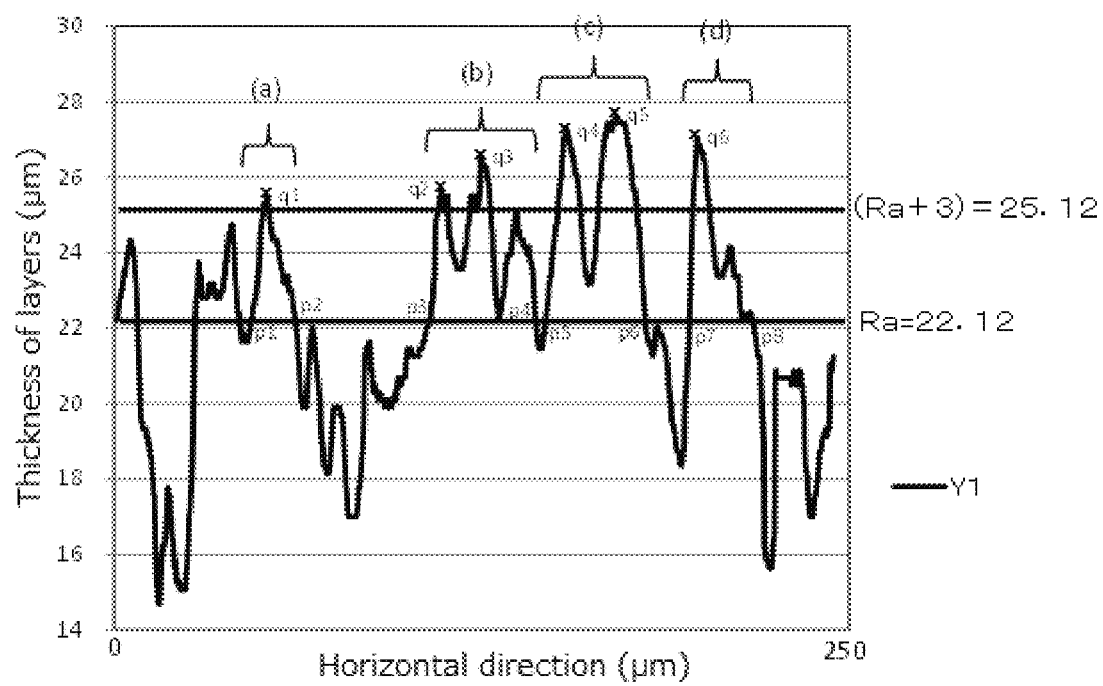
FIG. 5 is a graph, which is extracted from the graph showing the variations of the thicknesses of the layers in FIG. 4, showing only the graph of the thickness of the layer (Y1) at positions with a horizontal distance being made to vary from 0 μm to 250 μm in a range of 250 μm in a horizontal direction freely-selected on the cross section (P1).

FIG. 5 is a graph, which is extracted from the graph showing the variations of the thicknesses of the layers in FIG. 4, showing only the graph showing the variation of the thickness of the layer (Y1) observed in a range of 0 μm to 250 μm in the horizontal direction freely-selected on the cross section (P1).

The "maximum value (Q)" and the "range" defined in the requirement (III) will be described with reference to FIG. 5.

Focusing on the range (a) in FIG. 5, the value of the thickness of the layer (Y1) at positions with a horizontal distance being made to vary from 0 μm to 250 μm exceeds Ra (μm) at the point p1, and then subsequently exceeds Ra+3 (μm) to reach the point q1. With the further progress in the horizontal direction, the value of the thickness of the layer (Y1) decreased to underrun Ra+3 (μm) to reach the point p2, and further underruns Ra (μm).

At this time, when the variation of the value of the thickness of the layer (Y1) on transition from the point p1 to the point p2 is applied to the definition of the requirement (III), the "point q1" in FIG. 5 corresponds to the "maximum value (Q)" defined in the requirement (III), and the "range (a)" in the horizontal direction on transition from the point p to the point p2 corresponds to the range defined in the requirement (III).

Focusing on the range (d) on transition from the point p7 to the point p8 in the horizontal direction in FIG. 5, the state transitions "the point p7"→"the value of the thickness of the layer (Y1) is increased"→"the value of the thickness of the layer (Y1) exceeds Ra (μm)"→"the value of the thickness of the layer (Y1) exceeds Ra+3 (μm)"→"reaching the point q6"→"the value of the thickness of the layer (Y1) is decreased"→"the value of the thickness of the layer (Y1) underruns Ra+3 (μm)"→"the point p8"→"the value of the thickness of the layer (Y1) underruns Ra (μm)".

Accordingly, the "point q7" in FIG. 5 corresponds to the "maximum value (Q)" defined in the requirement (III), and the "range (d)" in the horizontal direction on transition from the point p7 to the point p8 corresponds to the range defined in the requirement (III).

In the range (b) on transition from the point p3 to the point p4 in the horizontal direction in FIG. 5, both the "point q2" and the "point q3" correspond to the "maximum value (Q)" defined in the requirement (III).

The "range" defined in the requirement (III) is a range in the horizontal direction from the state that "the value of the thickness of the layer (Y1) exceeds Ra (μm)" to the state that "the value of the thickness of the layer (Y1) underruns Ra (μm)".

In the range (b) on transition from the point p3 to the point p4 in the horizontal direction in FIG. 5, the value of the thickness of the layer (Y1) is increased from the point p3, once exceeds Ra+3 (μm) to reach the "point q2", then is decreased to underrun Ra+3 (μm), is then again increased to exceeds Ra+3 (μm), and reaches the "point q3" as the extremal value of the graph. In this case, both the "point q2" and the "point q3" correspond to the "maximum value (Q)" defined in the requirement (III).

However, the value of the thickness of the layer (Y1) never underruns Ra (μm) until reaching the "point q3", and therefore the end point of the "range" defined in the requirement (III) is still not identified.

Thereafter, the value of the thickness of the layer (Y1) is decreased from the point q3 to reach the point p4, underrunning Ra (μm).

Accordingly, in FIG. 5, the "point q2" and the "point q3" correspond to the "maximum value (Q)" defined in the requirement (III), and the "range (b)" in the horizontal direction on transition from the point p3 to the point p4 corresponds to the range defined in the requirement (III).

Due to the same reasons, in FIG. 5, the "point q4" and the "point q5" correspond to the "maximum value (Q)" defined in the requirement (III), and the "range (c)" in the horizontal direction on transition from the point p5 to the point p6 corresponds to the range defined in the requirement (III).

Based on the above, in the graph of the value of the thickness of the layer (Y1) shown in FIG. 5, four "ranges" defined in the requirement (III) (i.e., the ranges (a) to (d)) exist.

The existence of the "range" defined in the requirement (III) in the graph of the value of the thickness of the layer (Y1) means that the thickness of the layer (Y1) shows large fluctuations from large values to small values in the horizontal direction.

This not only contributes to the enhancement of the interlayer adhesion, but also provides a tendency of enhancing the pressure sensitive adhesive strength since the film strength is enhanced at the position with an increased thickness of the layer (Y1), whereas the thicknesses of the layer (Xα) and the layer (Xβ) are increased at the position with a decreased thickness of the layer (Y1).

As a result, the pressure sensitive adhesive sheet that has at least one range defined in the requirement (III) can be excellent in interlayer adhesion and can be further excellent in balance between the film strength and the pressure sensitive adhesive strength.

From the aforementioned view point, the number of the range defined in the requirement (III) is preferably 2 or more, more preferably 3 or more, and further preferably 4 or more, and is preferably 10 or less, and more preferably 8 or less.

<Embodiment of Resin Layer Containing Resin Part (X) and Particle Part (Y)>

In the pressure sensitive adhesive sheet of one embodiment of the present invention, the resin layer is preferably a multilayer structure that contains a resin part (X) containing a resin and a particle part (Y) consisting of particles, in which the layer (Xβ) mainly contains the resin part (X), the layer (Y1) contains the particle part (Y), and the layer (Xα) mainly contains the resin part (X).

With the resin layer containing the particle part (Y), the film strength of the resin layer can be enhanced.

In the aforementioned embodiment, the layer (Xβ) and the layer (Xα) each are a layer that mainly contains the resin part (X), and may further contain the particle part (Y).

However, the contents of the particle part (Y) in the layer (Xβ) and the layer (Xα) each independently are less than 15% by mass based on the total mass (100% by mass) of the layer (Xβ) or the layer (Xα), and is smaller than the content of the resin of the layer (Xβ) and the layer (Xα).

Therefore, in the embodiment, the layer (Xβ) and the layer (Xα) are distinguished from the layer (Y1) in the point of the content of the particle part (Y).

The layer (Xβ) and the layer (Xα) may further contain a void part (Z) in addition to the resin part (X) and the particle part (Y).

In the aforementioned embodiment, the contents of the resin part (X) in the layer (Xβ) and the layer (Xα) each independently are generally more than 85% by mass, preferably 87 to 100% by mass, more preferably 90 to 100% by mass, further preferably 95 to 100% by mass, and still further preferably 100% by mass, based on the total mass (100% by mass) of the layer (Xβ) or the layer (Xα).

The aforementioned "content of the resin part (X)" means the total content of the components other than the fine particles, such as a resin, a tackifier, a crosslinking agent, and an ordinary additive, constituting the resin part (X) contained in the layer (Xβ) or the layer (Xα).

In the aforementioned embodiment, the contents of the fine particles constituting the particle part (Y) in the layer (Xβ) and the layer (Xα) each independently are less than 15% by mass, preferably 0 to 13% by mass, more preferably 0 to 10% by mass, further preferably 0 to 5% by mass, and still further preferably 0% by mass, based on the total mass (100% by mass) of the layer (Xβ) or the layer (Xα).

In the description herein, the "contents of the fine particles in the layer (Xβ) and the layer (Xα)" can be assumed to be the contents of the fine particles in the total amount (100% by mass (except for a diluent solvent)) of the resin composition as the forming material for the layer (Xβ) or the layer (Xα).

In the aforementioned embodiment, the content of the resin in the layer (Xα) is generally 30 to 100% by mass, preferably 40 to 100% by mass, more preferably 50 to 100% by mass, and further preferably 60 to 100% by mass, based on the total mass (100% by mass) of the layer (Xα).

The content of the resin in the layer (Xβ) is generally 50 to 100% by mass, preferably 65 to 100% by mass, more preferably 75 to 100% by mass, and further preferably 85 to 100% by mass, based on the total mass (100% by mass) of the layer (Xβ).

In the description herein, the "contents of the resin in the layer (Xβ) and the layer (Xα)" can be assumed to be the contents of the resin in the total amount (100% by mass (except for a diluent solvent)) of the resin composition as the forming material for the layer (Xβ) or the layer (Xα).

In the aforementioned embodiment, the layer (Y1) may be a layer formed only of the particle part (Y), may be a layer containing the resin part (X) along with the particle part (Y), or may be a layer further containing a void part (Z).

The content of the fine particles constituting the particle part (Y) in the layer (Y1) is generally 15% by mass or more, preferably 20 to 100% by mass, more preferably 25 to 90% by mass, further preferably 30 to 85% by mass, and still further preferably 35 to 80% by mass, based on the total mass (100% by mass) of the layer (Y1).

In the aforementioned embodiment, the content of the resin in the layer (Y1) is generally 0 to 85% by mass, preferably 1 to 80% by mass, more preferably 5 to 75% by mass, further preferably 10 to 70% by mass, and still further preferably 20 to 65% by mass, based on the total mass (100% by mass) of the layer (Y1).

In the description herein, the "content of the fine particles in the layer (Y1)" and the "content of the resin in the layer (Y1)" can be assumed to be the contents of the fine particles and the resin respectively in the total amount (100% by mass (except for a diluent solvent)) of the composition as the forming material for the layer (Y1).

In the aforementioned embodiment of the present invention, the layer (Xα) is preferably a layer formed by a composition (xα) containing a resin and having a content of fine particles of less than 15% by mass.

Similarly, the layer (Xβ) is preferably a layer formed by a composition (xβ) containing a resin and having a content of fine particles of less than 15% by mass.

Furthermore, the layer (Y1) is preferably a layer formed by a composition (y) containing fine particles, and more preferably a layer formed by a composition (y) containing fine particles in an amount of 15% by mass or more.

Preferred embodiments of the composition (xα), the composition (xβ), and the composition (y) (such as the contained components and the contents) are as described later.

In one embodiment of the present invention, from the viewpoint of forming a resin layer that is a multilayer structure having the layer (Xα), the layer (Y1), and the layer (Xβ) satisfying the aforementioned requirements, the resin layer is preferably formed through self-formation.

In the present invention, the "self-formation" means a phenomenon of naturally forming a disorganized profile in a process of self-sustaining formation of a resin layer, and more specifically, means a phenomenon of naturally forming a disorganized profile in a process of self-sustaining formation of a resin layer by drying a coating film formed of a composition as a forming material for a resin layer.

The thicknesses of the layers constituting the resin layer that is formed through self-formation tend to be non-uniform, and the layer (Xα), the layer (Y1), and the layer (Xβ) satisfying the aforementioned requirements can be readily formed.

As in the pressure sensitive adhesive sheet shown in FIG. 1, irregular concave portions 13 tend to be formed on the surface (α) 12a of the layer (Xα) through the process of self-formation of the resin layer, and the thicknesses of the layers tend to be non-uniform associated with the formation of the concave portions 13.

The process of the formation of the resin layer having non-uniform thicknesses of the layers and the concave portions formed through self-formation of the resin layer can be considered as follows.

In the formation process of the resin layer having two layers having different constitutional components, a contraction stress occurs inside the coating film in the process of drying the plural coating films formed with different compositions, whereby the migration of the constitutional components occurs inside the plural coating films, and further cracks are formed on the surface (α) at portions where the bonding force of the resin is weakened. It is considered that the thicknesses of the layers become non-uniform due to the migration of the constitutional components that exist around the migrated constitutional components to the portions where the migrated constitutional components have existed, and the concave portions are formed on the surface (α) of the resin layer due to the inflow of the resin that exists around the cracked portions to the spaces having been temporarily formed by cracking.

Accordingly, the large-scale migration of the resin occurs simultaneously with the formation of the concave portions, and thereby the thicknesses of the layers became further non-uniform, by which the layer (Xα), the layer (Y1), and the layer (Xβ) satisfying the aforementioned requirements can be readily formed.

It is considered that by forming two layers of coating films having different constitutional component of the resin and then drying the two layers of coating films simultaneously, a difference in contraction stress occurs inside the coating film on drying, whereby the thicknesses of the layers become non-uniform, and simultaneously cracks tend to occur on the surface (α).

From the viewpoint of readily forming the concave portion on the surface (α) to form readily the layer (Xα), the layer (Y1), and the layer (X1) satisfying the aforementioned requirements, it is preferred to control the condition appropriately in consideration of the following factors. It is considered that these factors act in a complex manner to facilitate the formation of the concave portions, so as to form readily the layer (Xα), the layer (Y1), and the layer (Xβ) satisfying the aforementioned requirements. The suitable embodiments of the factors for facilitating the formation of the concave portion are those described in the corresponding sections described later.

The kind, the constituent monomers, the molecular weight, and the content of the resin contained in the composition as the forming material for the coating film The kind of the crosslinking agent and the kind of the solvent contained in the composition as the forming material for the coating film The viscosity and the solid concentration of the composition as the forming material for the coating film The thickness of the coating film formed (when plural layers are formed, the thicknesses of the coating films)

The drying temperature and the drying time for the coating film formed

The aforementioned factors are preferably appropriately set in consideration of the flowability and the like of the resin contained in the coating film formed.

For example, in the case where the composition contains fine particles, the viscosity of the coating film formed of the composition containing a large amount of fine particles may be controlled to an appropriate range, and thereby the coating film can be appropriately suppressed from being mixed with another coating film (a coating film containing a large amount of a resin) while retaining the prescribed flowability of the fine particles inside the coating film. By controlling in this manner, the coating film containing a large amount of a resin readily forms cracks in the horizontal direction and readily forms concave portions, thereby providing a tendency of forming the layer (Xα), the layer (Y1), and the layer (Xβ) satisfying the aforementioned requirements.

Among the aforementioned factors, the kind, the constituent monomers, and the molecular weight of the resin, and the content of the resin are preferably controlled appropriately to make the resin contained in the coating film containing a large amount of the resin to have suitable viscoelasticity.

Specifically, the hardness of the coating film (i.e., the hardness determined by such factors as the viscoelasticity of the resin, the viscosity of the coating liquid, and the like) may be made appropriately large, so as to increase the contraction stress of the resin part (X), and thereby concave portions are readily formed to form the layer (Xα), the layer (Y1), and the layer (Xβ) satisfying the aforementioned requirements.

With a larger hardness of the coating film, the contraction stress is increased to facilitate the formation of concave portions, but the coating suitability may be deteriorated with a too large hardness. With excessively increased elasticity of the resin, there is a tendency that the pressure sensitive adhesive strength of the resin layer formed from the coating film is lowered. It is preferred to control appropriately the viscoelasticity of the resin in consideration of these points.

In the case where the composition or the coating film contains fine particles, it is considered that the extent of swelling of the thickness of the resin layer due to the fine particles and the self-formation power of the concave portions can be controlled by optimizing the dispersed state of the fine particles, and consequently can be controlled to facilitate the formation of concave portions on the surface (α), and thus the layer (Xα), the layer (Y1), and the layer (Xβ) satisfying the aforementioned requirements can be formed.

Furthermore, the aforementioned factors are preferably appropriately set in consideration of the crosslinking rate of the coating film formed (or the composition as the forming material for the coating film).

Specifically, in the case where the cross linking rate of the coating film is too large, there may be a concern that the coating film is cured before forming concave portions. Furthermore, the size of the cracks of the coating film and the size of the concave portions are affected.

The crosslinking rate of the coating film can be controlled by appropriately setting the kind of the crosslinking agent and the kind of the solvent in the composition as the forming material for the coating film, and the drying time and the drying temperature for the coating film.

In the case where the resin layer is a layer containing the resin part (X) containing a resin and the particle part (Y) consisting of particles, in the resin layer formed through the self-formation, there is a tendency as shown in FIGS. 1(a) to 1(d) that the particle part (Y) has such a distribution that the proportion occupied by the particle part (Y) becomes relatively smaller in the portion having the concave portion 13 on the surface (α) than the other portions.

It is considered that this is because the distribution occurs due to the migration of the fine particles having existed at the position having the concave portion on the surface (α), on forming the concave portion.

Accordingly, in the resin layer formed through the self-formation, the resin layer readily satisfies the following requirement (IV).

Requirement (IV): In a range of 250 μm in a horizontal direction freely-selected on the cross section (P1), a concave portion exists on the surface (α) of the layer (Xα) laminated vertically above a position in the layer (Y1), at which the thickness of the layer (Y1) is the minimum value ($H_{MIN}$ (Y1)).

The shape of the concave portions thus formed through self-formation of the resin layer as above may be controlled to some extent by controlling the drying condition, the kinds and the contents of the components in the composition as a forming material for the resin layer, but as different from grooves formed by transferring an embossed pattern, it can be said that "the exactly same shape virtually cannot be reproduced".

Accordingly, the shape of the concave portion 13 tends to be an irregular shape, and the formation of the concave portions having irregular shapes makes the flat faces 14 having irregular shapes.

<Concave Portion Capable of Existing on Surface (α)>

In the pressure sensitive adhesive sheet of one embodiment of the present invention, as shown in FIG. 1, a concave portion 13 and a flat face 14 may exist on the surface (α) of the layer (Xα) constituting the resin layer.

The concave portion 13 existing on the surface (α) can play a role of air-discharge channel for removing the "air accumulation" out of the sheet to be formed in attaching the surface (α) to an adherend. Accordingly, the pressure sensitive adhesive sheet having the concave portion 13 existing on the surface (α) can have excellent air escape property.

The flat face 14 existing on the surface (α) is a face coming into direct contact with the adherend and adhering closely thereto in attaching to the adherend and is a site influencing the pressure sensitive adhesive strength of the pressure sensitive adhesive sheet.

The concave portions and the flat faces existing on the surface (α) are preferably formed as by-products in the formation of the layer (Xα), the layer (Y1), and the layer (Xβ) satisfying the aforementioned requirements in the self-forming process of the resin layer.

In other words, the concave portions and the flat faces existing on the surface (α) are preferably not formed by using a release material having an embossed pattern.

In one embodiment of the present invention, from the viewpoint of providing a pressure sensitive adhesive sheet excellent in air escape property, the concave portion 13 existing on the surface (α) is preferably a concave portion having an irregular shape, and is more preferably a concave portion that can be visually recognized to have an irregular shape. The concave portion having an irregular shape can prevent such a phenomenon that all the concave portions 13 are collapsed to expunge the air escape paths due to application of pressure in one direction.

In one embodiment of the present invention, from the viewpoint of providing a pressure sensitive adhesive sheet excellent in pressure sensitive adhesion characteristics, on observation of the resin layer 12 from the side of the surface (α) 12a, the flat face 14 existing on the surface (α) is preferably a flat face having an irregular shape, and more preferably a flat face that can be visually recognized to have an irregular shape.

The concave portions and the flat faces that are formed through self-formation of the resin layer readily become concave portions and flat faces that can be visually recognized to have an irregular shape.

In the pressure sensitive adhesive sheet 2a or 2b having the release material 22 laminated on the surface (α) 12a of the resin layer 12 as shown in FIG. 1(c) or 1(d), the surface (α) exposed by removing the release material 22 is to be visually observed.

In the present invention, the term "irregular shape" means such a shape that does not have a shape capable of drawing the center thereof, such as a circle and an ellipse, or a regular shape, such as polygonal shapes, has no regularity in shape, and has no resemblance among the respective shapes.

The "polygonal shape" herein, which is excluded from the irregular shape, is a diagram capable of drawing a diagonal line inside the diagram (without protruding outside) and means a diagram surrounded by straight lines having a sum of the internal angles of 180×n (wherein n represents a natural number). The polygonal shape includes a polygonal shape having a rounded vertex with a curved profile.

Each configuration of the pressure sensitive adhesive sheet of the present invention is hereunder described.

[Substrate]

The substrate to be used in one embodiment of the present invention is not particularly limited, and examples thereof include a paper substrate, a resin film or sheet, and a substrate containing a paper substrate laminated with a resin, which may be appropriately selected depending upon the purpose of the pressure sensitive adhesive sheet of one embodiment of the present invention.

Examples of paper constituting the paper substrate include thin paper, medium quality paper, wood-free paper, impregnated paper, coated paper, art paper, parchment paper and glassine paper.

Examples of the resin constituting the resin film or sheet include a polyolefin resin, such as polyethylene, polypropylene; a vinyl resin, such as polyvinyl chloride, polyvinylidene chloride, polyvinyl alcohol, an ethylene-vinyl acetate copolymer, an ethylene-vinyl alcohol copolymer; a polyester resin, such as polyethylene terephthalate, polybutylene terephthalate, polyethylene naphthalate; polystyrene; an acrylonitrile-butadiene-styrene copolymer; cellulose triacetate; polycarbonate; a urethane resin, such as polyurethane, acrylic-modified polyurethane; polymethylpentene; polysulfone; polyetheretherketone; polyether sulfone; polyphenylene sulfide; a polyimide resin, such as polyether imide, polyimide; a polyamide resin; an acrylic resin; a fluorine resin.

Examples of the substrate containing a paper substrate laminated with a resin include laminated paper containing the aforementioned paper substrate laminated with a thermoplastic resin, such as polyethylene.

Among these substrates, a resin film or sheet is preferred, a film or sheet formed of a polyester resin is more preferred, and a film or sheet formed of polyethylene terephthalate (PET) is still more preferred.

In the case where the pressure sensitive adhesive sheet of the present invention is used for an application requiring the heat resistance, a film or sheet constituted of a resin selected from polyethylene naphthalate and a polyimide resin is preferred, and in the case where the pressure sensitive adhesive sheet is used for an application requiring the weather resistance, a film or sheet constituted of a resin selected from polyvinyl chloride, polyvinylidene chloride, an acrylic resin, and a fluorine resin is preferred.

Though the thickness of the substrate may be suitably set according to an application of the pressure sensitive adhesive sheet of the present invention, from the viewpoint of handleability and economy, it is preferably 5 to 1,000 μm, more preferably 10 to 500 μm, still more preferably 12 to 250 μm, and yet still more preferably 15 to 150 μm.

The substrate may further contain various additives, such as an ultraviolet ray absorbent, a light stabilizer, an antioxidant, an antistatic agent, a slipping agent, an antiblocking agent, a colorant.

From the viewpoint of improving the blister resistance of the resulting pressure sensitive adhesive sheet, the substrate to be used in one embodiment of the present invention is preferably a non-air permeable substrate, and specifically, a substrate having a metal layer on the surface of the aforementioned resin film or sheet is preferred.

Examples of the metal which is contained in the metal layer include a metal having metallic gloss, such as aluminum, tin, chromium and titanium.

Examples of the method of forming the metal layer include a method of vapor-depositing the aforementioned metal by the PVD method, such as vacuum vapor deposition, sputtering, ion plating; a method of attaching a metal foil formed of the aforementioned metal with an ordinary pressure sensitive adhesive. Among those, a method of vapor-depositing the aforementioned metal by the PVD method is preferred.

Furthermore, in the case where a resin film or sheet is used as the substrate, from the viewpoint of improving the adhesion to the resin layer to be laminated on the resin film or sheet, the surface of the resin film or sheet may be subjected to a surface treatment by an oxidizing method, a roughening method, or the like, or may be subjected to a primer treatment.

Examples of the oxidizing method include a corona discharge treatment, a plasma discharge treatment, a chromic acid treatment (wet process), a hot air treatment, and an ozone treatment, and an ultraviolet ray irradiation treatment, and examples of the roughening treatment include a sand blasting treatment and a solvent treatment.

[Release Material]

As the release material to be used in one embodiment of the present invention, a release sheet having both surfaces subjected to a release treatment, a release sheet having one surface subjected to a release treatment, and the like are usable, and examples thereof include a substrate for the release material having coated thereon a release agent.

The release treatment is preferably performed on a flat release material without a relief shape formed thereon (for example, a release material having no emboss pattern formed thereon).

Examples of the substrate for the release material include the paper substrate, the resin film or sheet, and the substrate containing a paper substrate laminated with a resin described above used as the substrate of the pressure sensitive adhesive sheet of one embodiment of the present invention.

Examples of the release agent include a rubber elastomer, such as a silicone resin, an olefin resin, an isoprene resin and a butadiene resin, and a long-chain alkyl resin, an alkyd resin, and a fluorine resin.

Though the thickness of the release material is not particularly limited, it is preferably 10 to 200 μm, more preferably 25 to 170 μm, and still more preferably 35 to 80 μm.

[Resin Layer]

As shown in FIG. 1, the resin layer 12 which the pressure sensitive adhesive sheet of the present invention has is preferably one containing the resin part (X) containing a resin and the particle part (Y) composed of fine particles.

The resin part (X) means a part containing a component other than the fine particles to be contained in the resin layer. Namely, not only the resin but also a component other than the fine particles, such as a tackifier, a crosslinking agent, an ordinary additive, is included in the "resin part (X)".

Meanwhile, the particle part (Y) means a part composed of fine particles contained in the resin layer.

When the particle part (Y) is contained in the resin layer, the shape retentive property after being attached can be improved, and in the case of using the resulting pressure sensitive adhesive sheet at a high temperature, generation of blister can be effectively inhibited.

Regarding the configuration of distribution of the resin part (X) and the particle part (Y) in the resin layer 12, the resin parts (X) and the particle parts (Y) may be distributed almost evenly as one configuration, or as a different configuration, a site mainly containing the resin parts (X) and a site mainly containing the particle parts (Y) may be locally divided.

It is preferred that the resin layer which the pressure sensitive adhesive sheet of one embodiment of the present invention has additionally has a void part (Z) in addition to the resin part (X) and the particle part (Y). When the resin layer has the void part (Z), the blister resistance of the pressure sensitive adhesive sheet can be improved.

The void part (Z) includes voids existing between the aforementioned fine particles as well as, when the aforementioned fine particles are secondary particles, voids existing inside the secondary particles.

In the case where the resin layer has a multilayer structure, even though the void part (Z) exists in the process of forming the resin layer or just after formation process thereof, the resin part (X) may flow into the void part (Z) to expunge the void, resulting in the resin layer having no void part (Z) in some cases.

Even in the case where the void part (Z) having existed at one time in the resin layer are expunged, when the concave portions exist on the surface (α) of the resin layer, the existence of the concave portions can improve not only the air escape property but also the blister resistance.

From the viewpoint of improving the air escape property and the blister resistance of the pressure sensitive adhesive sheet, the shear storage elastic modulus at 100° C. of the resin layer which the pressure sensitive adhesive sheet of one embodiment of the present invention has is preferably $9.0 \times 10^3$ Pa or more, more preferably $1.0 \times 10^4$ Pa or more, and still more preferably $2.0 \times 10^4$ Pa or more.

In the present invention, the shear storage elastic modulus at 100° C. of the resin layer means a value measured with a viscoelastometer (for example, an apparatus name: "DYNAMIC ANALYZER RDA II", manufactured by Rheometrics Inc.) at a frequency of 1 Hz.

The total thickness of the resin layer is preferably 1 to 300 μm, more preferably 5 to 150 μm, and still more preferably 10 to 75 μm.

In the pressure sensitive adhesive sheet of the present invention, at least the surface (α) of the resin layer on the side opposite to the side on which at least the substrate or the release material is provided has pressure sensitive adhesiveness, but the surface (β) of the resin layer on the side on which the substrate or the release material is provided may also has pressure sensitive adhesiveness.

The pressure sensitive adhesive strength of the surface (α) of the resin layer of the pressure sensitive adhesive sheet of one embodiment of the present invention is preferably 0.5 N/25 mm or more, more preferably 2.0 N/25 mm or more, still more preferably 3.0 N/25 mm or more, yet still more preferably 4.0 N/25 mm or more, and even yet still more preferably 7.0 N/25 mm or more.

In the case where the surface (β) of the resin layer also has pressure sensitive adhesiveness, the pressure sensitive adhesive strength of the surface (β) preferably belongs to the aforementioned range.

The value of the pressure sensitive adhesive strength of the pressure sensitive adhesive sheet means a value measured by the method described in Examples.

<Resin Part (X)>

The resin part (X) constituting the resin layer is a part containing any other component than fine particles contained in the resin layer, and in this point, this is differentiated from the particle part (Y).

The resin part (X) may contain a tackifier, a crosslinking agent, an ordinary additive, and so on together with the resin.

The content of the resin in the resin part (X) is typically 30% by mass or more, preferably 40% by mass or more, more preferably 50% by mass or more, still more preferably 55% by mass or more, yet still more preferably 60% by mass or more, and even yet still more preferably 70% by mass or more, and preferably 100% by mass or less, and more preferably 99.9% by mass or less, relative to the total amount (100% by mass) of the resin part (X).

In the present invention, a value of the content of the resin in the resin composition serving as the forming material for the resin part (X) may be considered to be the aforementioned "content of the resin in the resin part (X)".

The aforementioned resin which is contained in the resin part (X) preferably contains a pressure sensitive adhesive resin from the viewpoint of revealing pressure sensitive adhesiveness on the surface (α) of the resin layer to be formed.

In particular, in the case where the resin layer has a multilayer structure formed by laminating a layer (Xβ), a layer (Y1), and a layer (Xα) in this order from the side on which a substrate or a release material is provided, like in the pressure sensitive adhesive sheet 1a, etc. of FIG. 1(a), from the aforementioned viewpoints, it is preferred that at least the layer (Xα) contains a pressure sensitive adhesive resin. In addition, from the viewpoint of providing a configuration of a double-sided pressure sensitive adhesive sheet and from the viewpoint of improving the adhesion to the substrate, it is preferred that at least the layer (Xα) and the layer (Xβ) contain a pressure sensitive adhesive resin.

Examples of the pressure sensitive adhesive resin include an acrylic resin, a urethane resin, a rubber resin and a silicone resin.

Among these adhesive resins, an acrylic resin is preferably contained from the viewpoints of making the pressure sensitive adhesion characteristics and the weather resistance good and facilitating the formation of concave portions on the surface (α) of the resin layer.

The content of the acrylic resin is preferably 25 to 100% by mass, more preferably 50 to 100% by mass, still more preferably 70 to 100% by mass, yet still more preferably 80 to 100% by mass, and even yet still more preferably 100% by mass relative to the total amount (100% by mass) of the resin contained in the resin part (X).

From the viewpoint of facilitating the formation of concave portions on the surface (α) of the resin layer, the resin part (X) preferably contains a resin having a functional group and more preferably contains an acrylic resin having a functional group.

In particular, from the aforementioned viewpoints, it is preferred that at least the layer (Y1) contains a resin having a functional group.

The functional group is a group to be a crosslinking start point with a crosslinking agent, and examples thereof include a hydroxy group, a carboxy group, an epoxy group, an amino group, a cyano group, a keto group and an alkoxysilyl group, with a carboxy group being preferred.

It is preferred that the resin part (X) further contains a crosslinking agent together with the aforementioned resin having a functional group. In particular, in the case where the resin layer has the aforementioned multilayer structure, it is preferred that at least the layer (Y1) contains a crosslinking agent together with the aforementioned resin having a functional group.

Examples of the crosslinking agent include an isocyanate crosslinking agent, an epoxy crosslinking agent, an aziridine crosslinking agent and a metal chelate crosslinking agent.

Examples of the isocyanate crosslinking agent include aromatic polyisocyanates, such as tolylene diisocyanate, diphenylmethane diisocyanate, and xylylene diisocyanate; aliphatic polyisocyanates, such as hexamethylene diisocyanate; alicyclic polyisocyanates, such as isophorone diisocyanate and hydrogenated diphenylmethane diisocyanate; biuret forms and isocyanurate forms of these compounds, and adduct forms that are a reaction product with a low-molecular active hydrogen-containing compound (e.g., ethylene glycol, propylene glycol, neopentyl glycol, trimethylolpropane, and castor oil).

Examples of the epoxy crosslinking agent include ethylene glycol glycidyl ether, 1,3-bis(N,N-diglycidylaminomethyl)cyclohexane, N,N,N',N'-tetraglycidyl-m-xylylenediamine, 1,6-hexanediol diglycidyl ether, trimethylolpropane diglycidyl ether, diglycidylaniline, and diglycidylamine.

Examples of the aziridine crosslinking agent include diphenylmethane-4,4'-bis(1-aziridinecarboxamide), trimethylolpropane tri-β-aziridinyl propionate, tetramethylolmethane tri-β-aziridinyl propionate, toluene-2,4-bis(1-aziridinecarboxamide), triethylenemelamine, bisisophthaloyl-1-(2-methylaziridine), tris-1-(2-methylaziridine)phosphine, and trimethylolpropane tri-β-(2-methylaziridine) propionate.

The metal chelate crosslinking agent includes chelate compounds in which the metal atom is aluminum, zirconium, titanium, zinc, iron, tin, or the like. From the viewpoint of facilitating the formation of concave portions on the surface (α) of the resin layer, an aluminum chelate crosslinking agent is preferred.

Examples of the aluminum chelate crosslinking agent include diisopropoxyaluminum monooleyl acetoacetate, monoisopropoxyaluminum bisoleyl acetoacetate, monoisoprop oxyaluminum monooleate monoethyl acetoacetate, diisopropoxyaluminum monolauryl acetoacetate, diisopropoxyaluminum monostearyl acetoacetate and diisopropoxyaluminum monoisostearyl acetoacetate.

These crosslinking agents may be used either alone or in combination of two or more thereof.

Among these, from the viewpoint of facilitating the formation of concave portions on the surface (α) of the resin layer, the resin part (X) preferably contains one or more selected from a metal chelate crosslinking agent and an epoxy crosslinking agent, more preferably contains a metal chelate crosslinking agent, and still more preferably contains an aluminum chelate crosslinking agent.

The content of the crosslinking agent in the resin part (X) is preferably 0.01 to 15 parts by mass, more preferably 0.1 to 10 parts by mass, and still more preferably 0.3 to 7.0 parts by mass relative to 100 parts by mass of the resin having a functional group to be contained in the resin part (X).

As one embodiment of the present invention, from the viewpoint of facilitating the formation of concave portions on the surface (α) of the resin layer, it is preferred that the resin part (X) contains both a metal chelate crosslinking agent and an epoxy crosslinking agent.

In the case where the resin part (X) contains both a metal chelate crosslinking agent and an epoxy crosslinking agent, from the aforementioned viewpoints, the content ratio of the metal chelate crosslinking agent to the epoxy crosslinking agent [(metal chelate crosslinking agent)/(epoxy crosslinking agent)] in the resin part (X) is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

From the viewpoint of more improving the pressure sensitive adhesion characteristics of the surface (α), it is preferred that the resin part (X) further contains a tackifier together with the pressure sensitive adhesive resin. In particular, in the case where the resin layer is the aforementioned multilayer structure, it is preferred that the layer (Xα) contains a pressure sensitive adhesive resin and a tackifier.

The tackifier to be used in the present invention is a component for auxiliarily improving the pressure sensitive adhesive strength of the pressure sensitive adhesive resin, refers to an oligomer whose mass average molecular weight (Mw) is typically less than 10,000, and is differentiated from the aforementioned pressure sensitive adhesive resin.

The mass average molecular weight (Mw) of the tackifier is preferably 400 to 8.000, more preferably 500 to 5,000, and still more preferably 800 to 3,500.

Examples of the tackifier include rosin resins, such as a rosin resin, a rosin ester resin and a rosin-modified phenol resin; hydrogenated rosin resins obtained by hydrogenating such a rosin resin; terpene resins, such as a terpene resin, an aromatic modified terpene resin, and a terpene phenol resin; hydrogenated terpene resins obtained by hydrogenating such a terpene resin; styrene resins obtained by copolymerizing a styrene monomer, such as α-methylstyrene, β-methylstyrene, and an aliphatic monomer; hydrogenated styrene resins obtained by hydrogenating such a styrene resin; C5 petroleum resins obtained by copolymerizing a C5 fraction, such as pentene, isoprene, piperine, and 1,3-pentadiene, and hydrogenated petroleum resins of such a C5 petroleum resin; C9 petroleum resins obtained by copolymerizing a C9 fraction, such as indene, vinyltoluene, as formed by hydrocracking of petroleum naphtha, and hydrogenated petroleum resins of such a C9 petroleum resin.

The tackifier to be used in the present invention may be used either alone or in combination of two or more thereof having a different softening point or structure from each other.

The softening point of the tackifier is preferably 80° C. or higher, more preferably 80 to 180° C., still more preferably 83 to 170° C., and yet still more preferably 85 to 150° C.

In the present invention, the "softening point" of the tackifier means a value measured in conformity with JIS K2531.

In the case of using two or mole plural tackifiers, it is preferred that the weight average of the softening points of those plural tackifiers belongs to the aforementioned range.

In the case where the tackifier is contained in the resin part (X), the content of the tackifier is preferably 1 part by mass or more, more preferably 1 to 200 parts by mass, still more preferably 3 to 150 parts by mass, and yet still more preferably 5 to 90 parts by mass relative to 100 parts by mass of the pressure sensitive adhesive resin which is contained in the resin part (X).

The resin part (X) may contain an ordinary additive other than the aforementioned crosslinking agent and tackifier.

Examples of the ordinary additive include an antioxidant, a softener (plasticizer), a rust inhibitor, a pigment, a dye, a retardant, a reaction accelerator, and a UV absorbent.

These ordinary additives may be each used either alone or in combination of two or more thereof.

In the case where these ordinary additives are contained, the content of each ordinary additive is preferably 0.0001 to 60 parts by mass, and more preferably 0.001 to 50 parts by mass relative to 100 parts by mass of the resin.

The aforementioned resin which is contained in the resin part (X) may be used either alone or in combination of two or more thereof.

The forming material for the resin part (X) of the resin layer which the pressure sensitive adhesive sheet of the present invention has is preferably a pressure sensitive adhesive containing a pressure sensitive adhesive resin having a functional group, more preferably an acrylic pressure sensitive adhesive containing an acrylic resin (A) having a functional group (hereinafter also referred to simply as "acrylic resin (A)"), and still more preferably an acrylic pressure sensitive adhesive containing an acrylic resin (A) having a functional group and a crosslinking agent (B).

The acrylic pressure sensitive adhesive may be any of a solvent type or an emulsion type.

The aforementioned acrylic pressure sensitive adhesive which is suitable as the forming material for the resin part (X) is hereunder described.

Examples of the acrylic resin (A) contained in the acrylic pressure sensitive adhesive include a polymer having a structural unit derived from an alkyl (meth)acrylate having a linear or branched alkyl group, and a polymer having a structural unit derived from a (meth)acrylate having a cyclic structure.

The mass average molecular weight (Mw) of the acrylic resin (A) is preferably 50,000 to 1,500,000, more preferably 150,000 to 1,300,000, still more preferably 250,000 to 1,100,000, and yet still more preferably 350,000 to 900,000.

The acrylic resin (A) preferably contains an acrylic copolymer (A1) having a structural unit (a1) derived from an alkyl (meth)acrylate (a1') having an alkyl group with 1 to 18 carbon atoms (hereinafter also referred to as "monomer (a1')") and a structural unit (a2) derived from a functional group-containing monomer (a2') (hereinafter also referred to as "monomer (a2')"), and more preferably contains an acrylic copolymer (A1).

The content of the acrylic copolymer (A1) is preferably 50 to 100% by mass, more preferably 70 to 100% by mass, still more preferably 80 to 100% by mass, and yet still more preferably 90 to 100% by mass relative to the total amount (100% by mass) of the acrylic resin (A) in the acrylic pressure sensitive adhesive.

The copolymerization morphology of the acrylic copolymer (A1) is not particularly limited, and the copolymer may be any of a block copolymer, a random copolymer, or a graft copolymer.

From the viewpoint of improving the pressure sensitive adhesion characteristics, the carbon number of the alkyl group which the monomer (a1') has is more preferably 4 to 12, still more preferably 4 to 8, and yet still more preferably 4 to 6.

Examples of the monomer (a1') include methyl (meth)acrylate, ethyl (meth)acrylate, propyl (meth)acrylate, butyl (meth)acrylate, 2-ethylhexyl (meth)acrylate, lauryl (meth)acrylate, tridecyl (meth)acrylate, and stearyl (meth)acrylate.

Among these, butyl (meth)acrylate and 2-ethylhexyl (meth)acrylate are preferred, and butyl (meth)acrylate is more preferred.

The content of the structural unit (a1) is preferably 50 to 99.5% by mass, more preferably 60 to 99% by mass, still more preferably 70 to 95% by mass, and yet still more preferably 80 to 93% by mass relative to all the structural units (100% by mass) of the acrylic copolymer (A1).

Examples of the monomer (a2') include a hydroxy group-containing monomer, a carboxy group-containing monomer, an epoxy group-containing monomer, an amino group-containing monomer, a cyano group-containing monomer, a keto group-containing monomer, and an alkoxysilyl group-containing monomer.

Among these, a carboxy group-containing monomer is more preferred.

Examples of the carboxy group-containing monomer include (meth)acrylic acid, maleic acid, fumaric acid, and itaconic acid, with (meth)acrylic acid being preferred.

The content of the structural unit (a2) is preferably 0.5 to 50% by mass, more preferably 1 to 40% by mass, still more preferably 5 to 30% by mass, and yet still more preferably 7 to 20% by mass relative to all the structural units (100% by mass) of the acrylic copolymer (A1).

The acrylic copolymer (A1) may have a structural unit (a3) derived from any other monomer (a3') than the aforementioned monomers (a1') and (a2').

Examples of the other monomer (a3') include (meth)acrylates having a cyclic structure, such as cyclohexyl (meth)acrylate, benzyl (meth)acrylate, isobornyl (meth)acrylate, dicyclopentanyl (meth)acrylate, dicyclopentenyl (meth)acrylate, dicyclopentenyloxyethyl (meth)acrylate, and imido(meth)acrylate; vinyl acetate, acrylonitrile, and styrene.

The content of the structural unit (a3) is preferably 0 to 30% by mass, more preferably 0 to 20% by mass, still more preferably 0 to 10% by mass, and yet still more preferably 0 to 5% by mass relative to all the structural units (100% by mass) of the acrylic copolymer (A1).

The aforementioned monomers (a1') to (a3') may be each used either alone or in combination of two or more thereof.

A method for synthesis of the acrylic copolymer (A1) component is not particularly limited. For example, the copolymer is produced according to a method including dissolving raw material monomers in a solvent and polymerizing them in a mode of solution polymerization in the presence of a polymerization initiator, a chain transfer agent, and the like, or a method of emulsion polymerization in an aqueous system using raw material monomers in the presence of an emulsifier, a polymerization initiator, a chain transfer agent, a dispersant, and the like.

The crosslinking agent (B) to be contained in the aforementioned acrylic pressure sensitive adhesive includes those as described above, but from the viewpoint of bettering the pressure sensitive adhesion characteristics and from the viewpoint of facilitating the formation of concave portions on the surface ($\alpha$) of the resin layer, one or more selected from a metal chelate crosslinking agent and an epoxy crosslinking agent are preferably contained, a metal chelate crosslinking agent is more preferably contained, and an aluminum chelate crosslinking agent is still more preferably contained.

As one embodiment of the present invention, from the viewpoint of improving the shape retentivity of the plural concave portions existing on the surface ($\alpha$) of the resin layer, the crosslinking agent (B) preferably contains both a metal chelate crosslinking agent and an epoxy crosslinking agent.

The content of the crosslinking agent (B) is preferably 0.01 to 15 parts by mass, more preferably 0.1 to 10 parts by mass, and still more preferably 0.3 to 7.0 parts by mass relative to 100 parts by mass of the acrylic resin (A) in the aforementioned acrylic pressure sensitive adhesive.

In the case where a metal chelate crosslinking agent and an epoxy crosslinking agents are used in combination, the content ratio of the metal chelate crosslinking agent to the epoxy crosslinking agent [(metal chelate crosslinking agent)/(epoxy crosslinking agent)] is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

The acrylic pressure sensitive adhesive to be used in one embodiment of the present invention may contain any ordinary additive within a range where the effects of the present invention are not impaired. Examples of the ordinary additive include those as described above, and the content of the ordinary additive is also as described above.

From the viewpoint of more improving the pressure sensitive adhesion characteristics of the surface ($\alpha$), it is preferred that the acrylic pressure sensitive adhesive to be used in one embodiment of the present invention further contains a tackifier. Examples of the tackifier include those as described above, and the content of the tackifier is also as described above.

The acrylic pressure sensitive adhesive to be used in one embodiment of the present invention may contain any other pressure sensitive adhesive resin than the acrylic resin (A) (for example, a urethane resin, a rubber resin and a silicone resin) within a range where the effects of the present invention are not imp aired.

The content of the acrylic resin (A) in the acrylic pressure sensitive adhesive is preferably 50 to 100% by mass, more preferably 70 to 100% by mass, still more preferably 80 to 100% by mass, and yet still more preferably 100% by mass relative to the total amount (100% by mass) of the pressure sensitive adhesive resin contained in the acrylic pressure sensitive adhesive.

<Particle Part (Y)>

The resin layer which the pressure sensitive adhesive sheet of one embodiment of the present invention has preferably contains a particle part (Y) composed of fine particles.

From the viewpoint of improving the air escape property and the blister resistance of the pressure sensitive adhesive sheet and from the viewpoint of facilitating the formation of concave portions and flat faces on the surface ($\alpha$) of the resin layer, the average particle diameter of the fine particles is preferably 0.01 to 100 µm, more preferably 0.05 to 25 µm, and still more preferably 0.1 to 10 µm.

The fine particles to be used in one embodiment of the present invention are not particularly limited, and examples thereof include inorganic particles, such as silica particles, metal oxide particles, barium sulfate, calcium carbonate, magnesium carbonate, glass beads, and smectite; organic particles, such as acrylic beads.

Among these fine particles, one or more selected from silica particles, metal oxide particles, and smectite are preferred, and silica particles are more preferred.

The silica particles to be used in one embodiment of the present invention may be any one of dry type silica and wet type silica.

The silica particles to be used in one embodiment of the present invention may also be an organic modified silica having been surface-modified with an organic compound having a reactive functional group or the like, an inorganic modified silica having been surface-treated with an inorganic compound, such as sodium aluminate and sodium hydroxide; an organic/inorganic modified silica having been surface-treated with any of these organic compounds and inorganic compounds, or an organic/inorganic modified silica having been surface-treated with an organic/inorganic hybrid material of a silane coupling agent.

These silica particles may be in the form of a mixture of two or more thereof.

The mass concentration of silica in the silica particles is preferably 70 to 100% by mass, more preferably 85 to 100% by mass, and still more preferably 90 to 100% by mass relative to the total amount (100% by mass) of the silica particles.

From the viewpoint of improving the air escape property and the blister resistance of the pressure sensitive adhesive sheet and from the viewpoint of facilitating the formation of concave portions and flat faces on the surface ($\alpha$) of the resin layer, the volume average secondary particle diameter of the silica particles to be used in one embodiment of the present invention is preferably 0.5 to 10 µm, more preferably 1 to 8 µm, and still more preferably 1.5 to 5 µm.

In the present invention, the value of the volume average secondary particle diameter of the silica particles is a value determined through measurement of particle size distribution according to a Coulter counter method using Multisizer III or the like.

Examples of the metal oxide particles include particles made of a metal oxide selected from titanium oxide, alumina, boehmite, chromium oxide, nickel oxide, copper oxide, titanium oxide, zirconium oxide, indium oxide, zinc oxide, and composite oxides thereof, and also include sol particles composed of those metal oxides.

Examples of the smectite include montmorillonite, beidellite, hectorite, saponite, stevensite, nontronite and sauconite.

The mass retention rate after heating the resin layer of the pressure sensitive adhesive sheet of one embodiment of the present invention at 800° C. for 30 minutes is preferably 3 to 90% by mass, more preferably 5 to 80% by mass, further preferably 7 to 70% by mass, and still further preferably 9 to 60% by mass.

The mass retention rate can be assumed to be the content (% by mass) of the fine particles contained in the resin layer.

When the mass retention rate is 3% by mass or more, the pressure sensitive adhesive sheet can be excellent in air escape property and blister resistance. Furthermore, concave portions can be readily formed on the surface ($\alpha$) of the resin layer in the production of the pressure sensitive adhesive sheet of the present invention. When the mass retention rate is 90% by mass or less, the resin layer that has a high film strength and is excellent in water resistance and chemical resistance can be readily formed. When the mass retention rate is in the aforementioned range, concave portions can be readily formed on the surface ($\alpha$) of the resin layer in the process of self-formation of the resin layer.

[Method for producing Pressure Sensitive Adhesive Sheet]

The method for producing a pressure sensitive adhesive sheet of the present invention will be described.

The method for producing a pressure sensitive adhesive sheet of the present invention is not particularly limited, and from the viewpoint of the productivity and also from the viewpoint of facilitating the formation of concave portions and flat faces on the surface ($\alpha$) of the resin layer, a production method of a first embodiment including at least the following steps (1A) and (2A) and a production method of a second embodiment including at least the following steps (1B) and (2B) are preferred.

Step (1A): A step of forming, laminated in this order on a substrate or a release material, a coating film ($x\beta'$) containing a composition ($x\beta$) containing a resin and having a content of fine particles of less than 15% by mass, a coating film ($y'$) containing a composition ($y$) containing the fine particles in an amount of 15% by mass or more, and a coating film ($x\alpha'$) containing a composition ($x\alpha$) containing a resin and having the content of fine particles of less than 15% by mass.

Step (2A): A step of drying the coating film ($x\beta'$), the coating film ($y'$), and the coating film ($x\alpha'$) formed in the step (1A), simultaneously.

Step (1B): A step of forming, laminated in this order on a layer ($X\beta$) mainly containing a resin part ($X$) provided on a substrate or a release material, a coating film ($y'$) containing a composition ($y$) containing the fine particles in an amount of 15% by mass or more, and a coating film ($x\alpha'$) containing a composition ($x\alpha$) containing a resin and having a content of fine particles of less than 15% by mass.

Step (2B): A step of drying the coating film ($y'$) and the coating film ($x\alpha'$) formed in the step (1B), simultaneously.

The compositions ($x\beta$) and ($x\alpha$) used in the production methods of the first and second embodiments are a forming material for the resin part ($X$), and preferably contains a crosslinking agent along with the aforementioned resin, to which a tackifier and the aforementioned ordinary additive.

The composition ($y$) is a material for forming the particle part ($Y$), and may further contain a resin, a crosslinking agent, a tackifier, and the aforementioned ordinary additive. The composition ($y$) containing the components other than the fine particles, such as the resin, is a forming material for the particle part ($Y$) and simultaneously can be a forming material for the resin part ($X$).

(Compositions ($x\beta$) and ($x\alpha$))

Examples of the resin contained in the compositions ($x\beta$) and ($x\alpha$) include the resins constituting the aforementioned resin part ($X$), preferably a pressure sensitive adhesive resin having a functional group, more preferably the aforementioned acrylic resin (A) having a functional group, and further preferably the aforementioned acrylic copolymer (A1).

The content of the resin in the compositions ($x\beta$) and ($x\alpha$) is generally 30% by mass or more, preferably 40% by mass or more, more preferably 50% by mass or more, further preferably 55% by mass or more, still further preferably 60% by mass or more, and still more further preferably 70% by mass or more, and is preferably 100% by mass or less, more preferably 99.9% by mass or less, and further preferably 95% by mass or less, based on the total amount (100% by mass (except for a diluent solvent)) of the composition ($x\beta$) or ($x\alpha$).

Examples of the crosslinking agent contained in the compositions ($x\beta$) and ($x\alpha$) include the crosslinking agents contained in the aforementioned resin part ($X$), and the compositions ($x\beta$) and ($x\alpha$) preferably contains at least one selected from a metal chelate crosslinking agent and an epoxy crosslinking agent, and more preferably contains a metal chelate crosslinking agent.

In one embodiment of the present invention, the compositions ($x\beta$) and ($x\alpha$) preferably contain both a metal chelate crosslinking agent and an epoxy crosslinking agent.

In the case where the compositions ($x\beta$) and ($x\alpha$) contain both a metal chelate crosslinking agent and an epoxy crosslinking agent, the content ratio of the metal chelate crosslinking agent and the epoxy crosslinking agent (metal chelate crosslinking agent/epoxy crosslinking agent) in the composition ($x\beta$) or ($x\alpha$) in terms mass ratio is preferably 10/90 to 99.5/0.5, more preferably 50/50 to 99.0/1.0, further preferably 65/35 to 98.5/1.5, and still further preferably 75/25 to 98.0/2.0.

The content of the crosslinking agent is preferably 0.01 to 15 parts by mass, more preferably 0.1 to 10 parts by mass, and further preferably 0.3 to 7.0 parts by mass, per 100 parts by mass of the resin contained in the composition ($x\beta$) or ($x\alpha$).

The compositions ($x\beta$) and ($x\alpha$) are preferably an acrylic pressure sensitive adhesive containing the aforementioned acrylic resin (A) having a functional group and the aforementioned crosslinking agent (B), and more preferably an acrylic pressure sensitive adhesive containing the aforementioned acrylic copolymer (A1) and the aforementioned crosslinking agent (B). The acrylic pressure sensitive adhesive may further contain a tackifier and an ordinary additive.

The details of the acrylic pressure sensitive adhesive have been described above.

The compositions ($x\beta$) and ($x\alpha$) may contain the aforementioned fine particles.

However, the content of the fine particles in the compositions ($x\beta$) and ($x\alpha$) is less than 15% by mass, and is smaller than the content of the resin contained in the compositions ($x\beta$) and ($x\alpha$).

The specific content of the fine particles in the compositions ($x\beta$) and ($x\alpha$) is 15% by mass or less, preferably 0 to 13% by mass, more preferably 0 to 10% by mass, further preferably 0 to 5% by mass, and still further preferably 0% by mass, based on the total amount (100% by mass (except for a diluent solvent)) of the composition ($x\beta$) or ($x\alpha$).

(Composition ($y$))

The composition ($y$) is a forming material for the particle part ($Y$) and contains at least the aforementioned fine particles in an amount of 15% by mass or more. From the viewpoint of dispersibility of the fine particles, the composition (y) preferably contains a resin together with the fine particles, and more preferably further contains a crosslinking agent together with the resin. In addition, the composition (y) may further contain a tackifier or an ordinary additive.

The components other than the fine particles to be contained in the composition (y) (a resin, a crosslinking agent, a tackifier, and an ordinary additive) serve as the forming material for the resin part (X).

Examples of the fine particles to be contained in the composition (y) include those as described above, and from the viewpoint of forming the void part (Z) in the resin layer to provide a pressure sensitive adhesive sheet having improved blister resistance, one or more selected from silica particles, metal oxide particles, and smectite are preferred.

From the viewpoint of facilitating the formation of irregular concave portions on the surface ($\alpha$) of the resin layer through self-formation of the resin layer and flat faces, the content of the fine particles in the composition (y) is generally 15% by mass or more, preferably 20 to 100% by mass, more preferably 25 to 90% by mass, still more preferably 30 to 85% by mass, and yet still more preferably 35 to 80% by mass relative to the total amount (100% by mass (but excluding diluent solvent)) of the resin composition (y).

Examples of the resin to be contained in the composition (y) include the same resins as those of the resin to be contained in the aforementioned composition (x), and it is preferred that the same resin as in the composition (x) is contained. These resins may be used either alone or in combination of two or more thereof.

More specifically, the resin to be contained in the composition (y) is preferably a resin having a functional group, more preferably the aforementioned acrylic resin (A) having a functional group, and still more preferably the aforementioned acrylic copolymer (A1).

The content of the resin in the composition (y) is typically 0 to 85% by mass, preferably 1 to 80% by mass, more preferably 5 to 75% by mass, still more preferably 10 to 70% by mass, and yet still more preferably 20 to 65% by mass relative to the total amount (100% by mass (but excluding diluent solvent)) of the composition (y).

Examples of the crosslinking agent to be contained in the composition (y) include the same materials as those in the crosslinking agent to be contained in the aforementioned resin part (X). Among these, it is preferred that the composition (y) contains one or more selected from a metal chelate crosslinking agent and an epoxy crosslinking agent, and it is more preferred that the composition (y) contains a metal chelate crosslinking agent. Furthermore, as one embodiment of the present invention, it is preferred that the composition (y) contains both a metal chelate crosslinking agent and an epoxy crosslinking agent.

In the case where the composition (y) contains both a metal chelate crosslinking agent and an epoxy crosslinking agent, a suitable range of the content ratio (mass ratio) of the metal chelate crosslinking agent to the epoxy crosslinking agent in the composition (y) is the same as in the aforementioned composition (x).

The content of the crosslinking agent in the composition (y) is preferably 0.01 to 15 parts by mass, more preferably 0.1 to 10 parts by mass, and still more preferably 0.3 to 7.0 parts by mass relative to 100 parts by mass of the resin to be contained in the composition (y).

(Formation Method of Coating Films ($x\beta'$), ($x\alpha'$), and (y'))

In the formation of the coating film, for facilitating the formation of the coating film, a solvent is preferably blended with the compositions ($x\beta$), ($x\alpha$), and (y) to convert the composition to the form of a solution.

Examples of the solvent include water and an organic solvent.

Examples of the organic solvent include toluene, ethyl acetate, butyl acetate, methyl ethyl ketone, methyl isobutyl ketone, methanol, ethanol, isopropyl alcohol, t-butanol, sec-butanol, acetylacetone, cyclohexanone, n-hexane, and cyclohexane. These solvents may be used solely or as a combination of two or more thereof.

The formation method of the coating films ($x\beta'$), ($x\alpha'$), and (y') may be a method of coating the coating film successively, or from the viewpoint of the productivity, may be a method of coating the coating films simultaneously with a multilayer coater.

Examples of the coater used for the successive coating include a spin coater, a spray coater, a bar coater, a knife coater, a roll coater, a knife roll coater, a blade coater, a gravure coater, a curtain coater, and a die coater.

Examples of the coater used for the simultaneous coating with a multilayer coater include a curtain coater and a die coater, and among these, a die coater is preferred from the viewpoint of operability.

Production Method of First Embodiment

In the step (1A), it is preferred that the aforementioned solvent is blended in the composition ($x\beta$), the composition ($x\alpha$), and the composition (y) to form solutions of the compositions, and the solutions are coated.

The method of forming the coating film ($x\beta'$), the coating film (y'), and the coating film ($x\alpha'$) may be a method of successively forming the films with the aforementioned coater, in which the coating film ($x\beta'$) is formed on the substrate or the release material, then the coating film (y') is formed on the coating film ($x\beta'$), and then the coating film ($x\alpha'$) is formed on the coating film (y'), or may be a method of simultaneously forming the coating film ($x\beta'$), the coating film (y'), and the coating film ($x\alpha'$) with the aforementioned multilayer coater.

In the step (1A), after forming one or more coating layers of the coating film ($x\beta'$), the coating film (y'), and the coating film ($x\alpha'$), and before transition to the step (2A), a preliminary drying treatment may be performed to such an extent that the curing reaction of coating film does not proceed.

For example, the preliminary drying treatment may be performed each time after forming the coating film ($x\beta'$), the coating film (y'), and the coating film ($x\alpha'$), and the preliminary drying treatment may be performed at once after forming the coating film ($x\beta'$) and the coating film (y'), followed by forming the coating film ($x\alpha'$).

In the step (1A), the drying temperature for the preliminary drying treatment may be generally set appropriately to such a temperature range that does not cause the curing of the formed coating films, and is preferably lower than the drying temperature in the step (2A). The specific drying temperature designated by the definition "lower than the drying temperature in the step (2A)" is preferably 10 to 45° C., more preferably 10 to 34° C., and further preferably 15 to 30° C.

The step (2A) is a step of drying the coating film ($x\beta'$), the coating film (y'), and the coating film ($x\alpha'$) formed in the step (1A) simultaneously.

The drying temperature in this step is preferably 35 to 200° C., more preferably 60 to 180° C., further preferably 70 to 160° C., and still further preferably 80 to 140° C., from the viewpoint of facilitating the formation of concave portions and flat faces on the surface (α) of the resin layer.

In the step, the resin layer containing the resin part (X) and the particle part (Y) is formed.

The void part (Z) is readily formed around the particle part (Y) of the resin layer formed in the step.

The void part (Z) can be readily formed by using at least one selected from silica particles, metal oxide particles, and smectite as the fine particles contained in the composition (y).

Production Method of Second Embodiment

In the step (1B), the "layer (Xβ) mainly containing a resin part (X)" can be formed by drying the coating film (xβ') containing the composition (xβ) containing the resin as a main component.

The layer (Xβ) is formed with the composition (xβ), and therefore the layer (Xβ) may contain a crosslinking agent, an ordinary additive, and the like, in addition to the resin. The content of the resin part (X) in the layer (Xβ) has been described above.

The method of forming the layer (Xβ) may be a method of forming the coating film (xβ') containing the composition (xβ) containing the resin as a main component on a substrate or a release material, and drying the coating film (xβ').

The drying temperature at this time is not particularly limited, and is preferably 35 to 200° C., more preferably 60 to 180° C., further preferably 70 to 160° C., and still further preferably 80 to 140° C.

The embodiment is different from the first embodiment in such a point that the coating film (y') and the coating film (xα') are formed in this order on the layer (Xβ) obtained after drying, but not on the coating film (xβ').

In the step (1B), it is also preferred that the aforementioned solvent is blended in the composition (y) and the composition (xα) to form solutions of the compositions, and the solutions are coated.

The method of forming the coating film (y') and the coating film (xα') may be a method of successively forming the films with the aforementioned coater, in which the coating film (y') is formed on the layer (Xβ), and then the coating film (xα') is formed on the coating film (y'), or may be a method of simultaneously forming the coating film (y') and the coating film (xα') with the aforementioned multilayer coater.

In the step (1B), after forming the coating film (y') or after forming the coating film (y') and the coating film (xα'), and before transition to the step (2B), a preliminary drying treatment may be performed to such an extent that the curing reaction of coating film does not proceed.

In the step (1B), the drying temperature for the preliminary drying treatment may be generally set appropriately to such a temperature range that does not cause the curing of the formed coating films, and is preferably lower than the drying temperature in the step (2B). The specific drying temperature designated by the definition "lower than the drying temperature in the step (2B)" is preferably 10 to 45° C., more preferably 10 to 34° C., and further preferably 15 to 30° C.

The step (2B) is a step of drying the coating film (y') and the coating film (xα') formed in the step (1B), simultaneously.

The drying temperature in this step is preferably 35 to 200° C., more preferably 60 to 180° C., further preferably 70 to 160° C., and still further preferably 80 to 140° C., from the viewpoint of facilitating the formation of concave portions and flat faces on the surface (α) of the resin layer.

In the step, the resin layer containing the resin part (X) and the particle part (Y) is formed.

The void part (Z) is readily formed around the particle part (Y) of the resin layer formed in the step.

The void part (Z) can be readily formed by using at least one selected from silica particles, metal oxide particles, and smectite as the fine particles contained in the composition (y).

EXAMPLES

The present invention is described more specifically with reference to the following Examples, but it should be construed that the present invention is not limited to the following Examples. The physical property values in the following Production Examples and Examples are values measured by the following methods.

<Mass Average Molecular Weight (Mw)>

The measurement was performed by using a gel permeation chromatography instrument (manufactured by Tosoh Corporation, a product name: "HLC-8020), under the following conditions, and a value measured as the standard polystyrene conversion was used.

(Measurement Condition)

Column: "TSK guard column HXL-L", "TSK gel G2500HXL", "TSK gel G2000HXL", and "TSK gel G1000HXL" (all manufactured by Tosoh Corporation), connected in series Column temperature: 40° C.

Developing solvent: tetrahydrofuran

Flow rate: 1.0 mL/min

<Measurement of Volume Average Secondary Particle Diameter of Silica Particles>

The volume average secondary particle diameter of the silica particles was determined by measuring the particle size distribution with Multisizer III (manufactured by Beckman Coulter Inc.) by the Coulter Counter method.

<Measurement of Thickness of Resin Layer>

The thickness of the resin layer was measured by using a constant pressured thickness measuring instrument, manufactured by TECLOCK Corporation (model number: "PG-02J", standard specification: in conformity with JIS K6783, Z1702, and Z1709)

Specifically, a value obtained by measuring the total thickness of the pressure sensitive adhesive sheet as the measuring object, from which was then subtracted the previously measured thickness of the substrate or release sheet, was defined as the "thickness of resin layer".

Production Examples x-1 to x-4

(Preparation of Solutions (xβ-1) to (xβ-2) and (xα-1) to (xα-2) of Resin Composition)

To the solution of an acrylic resin that is a pressure sensitive adhesive resin, having the kind and the solid content shown in Table 1, a crosslinking agent and a tackifier, each having with the kind and the blending amount shown in Table 1, were added and then diluted with a diluent solvent shown in Table 1, thereby preparing solutions (xβ-1) to (xβ-2) and (xα-1) to (xα-2) of a resin composition each having the solid content shown in Table 1.

The details of the respective components shown in Table 1 used for the preparation of the solutions (xβ-1) to (xβ-2) and (xα-1) to (xα-2) of a resin composition are as follows.

<Solution of Acrylic Resin>

Solution (i): A mixed solution of toluene and ethyl acetate containing an acrylic resin (x-i) (an acrylic copolymer having structural units derived from raw material monomers, BA/AA=90/10 (% by mass), Mw: 630,000) having a solid concentration of 34.0% by mass.

Solution (ii): A mixed solution of toluene and ethyl acetate containing an acrylic resin (x-ii) (an acrylic copolymer having structural units derived from raw material monomers, BA/AA=90/10 (% by mass), Mw: 470,000) having a solid concentration of 37.0% by mass.

Solution (iii): A mixed solution of toluene and isopropyl alcohol (IPA) containing an acrylic resin (x-iii) (an acrylic copolymer having structural units derived from raw material monomers, 2EHA/VAc/AA=75/23/2 (% by mass), Mw: 660,000) having a solid concentration of 37.0% by mass.

Solution (iv): A solution of ethyl acetate containing an acrylic resin (x-iv) (an acrylic copolymer having structural units derived from raw material monomers, BA/AA/HEA=94/3/3 (% by mass), Mw: 1,000,000) having a solid concentration of 37.0% by mass.

The abbreviations of the raw material monomers constituting the aforementioned acrylic copolymers are as follows.

BA: n-Butyl acrylate
2EHA: 2-Ethylhexyl acrylate
AA: Acrylic acid
VAc: Vinyl acetate
HEA: 2-Hydroxyethyl acrylate <Crosslinking Agent>

Al crosslinking agent: Product name "M-5A", manufactured by Soken Chemical & Engineering Co., Ltd., aluminum chelate crosslinking agent, solid concentration: 4.95% by mass Epoxy crosslinking agent: A solution of an epoxy crosslinking agent obtained by diluting "TETRAD-C" (a product name, manufactured by Mitsubishi Gas Chemical Co., Inc.) with toluene to make a solid concentration of 5% by mass <Tackifier>

Rosin ester TF: A rosin ester tackifier, Mw: less than 10,000, softening point: 85° C.

Styrene TF: A styrene tackifier composed of a copolymer of a styrene monomer and an aliphatic monomer, Mw: less than 10,000, softening point: 95° C.

<Diluent Solvent>

Mixed solvent (1): A mixed solvent composed of a mixture of toluene/isopropyl alcohol (IPA)=65/35 (mass ratio)

Mixed solvent (2): A mixed solvent composed of a mixture of ethyl acetate/IPA=86/14 (mass ratio)

TABLE 1

| | Solution of resin composition | Solution of acrylic resin | | | | Crosslinking agent | | |
|---|---|---|---|---|---|---|---|---|
| | | Kind | Kind of resin | Blending amount (parts by mass) | Blending amount of solid (parts by mass) | Kind | Blending amount (parts by mass) | Blending amount of solid (parts by mass) |
| Production Example x-1 | (xβ-1) | Solution (i) | Acrylic resin (x-i) [BA/AA = 90/10 (wt %), Mw = 630,000] | 100.0 | 34.0 | Al crosslinking agent | 2.53 | 0.13 |
| | | | | | | Epoxy crosslinking agent | 0.38 | 0.02 |
| Production Example x-2 | (xβ-2) | Solution (ii) | Acrylic resin (x-ii) [BA/AA = 90/10 (wt %), Mw = 470,000] | 50.0 | 18.5 | Al crosslinking agent | 9.00 | 0.45 |
| | | Solution (iii) | Acrylic resin (x-iii) [2EHA/VAc/AA = 75/23/2 (wt %), Mw = 660,000] | 50.0 | 18.5 | | | |
| Production Example x-3 | (xα-1) | Solution (iv) | Acrylic resin (x-iv), [BA/AA/HEA = 94/3/3 (wt %), Mw = 1,000,000] | 100.0 | 37.0 | Al crosslinking agent | 1.00 | 0.05 |
| | | | | | | Epoxy crosslinking agent | 0.10 | 0.01 |
| Production Example x-4 | (xα-2) | Solution (iv) | Acrylic resin (x-iv), [BA/AA/HEA = 94/3/3 (wt %), Mw = 1,000,000] | 100.0 | 37.0 | Al crosslinking agent | 1.00 | 0.05 |
| | | | | | | Epoxy crosslinking agent | 0.10 | 0.01 |

| | Crosslinking agent Blending amount of solid relative to 100 parts by mass of resin (parts by mass) | Tackifier | | | | | |
|---|---|---|---|---|---|---|---|
| | | Kind | Blending amount of solid (parts by mass) | Total blending amount of solid (parts by mass) | Total blending amount of solid relative to 100 parts by mass of resin (parts by mass) | Diluent solvent Kind | Solid concentration of solution of resin composition (mass %) |
| Production Example x-1 | 0.37 0.06 | — | — | — | — | Mixed solvent (1) | 24 |

TABLE 1-continued

| | | | | | | | |
|---|---|---|---|---|---|---|---|
| Production Example x--2 | 1.20 | — | — | — | — | Mixed solvent (2) | 30 |
| Production Example x-3 | 0.13 0.01 | Rosin ester TF — | 10.0 — | 10.0 | 27.0 | Mixed solvent (2) | 30 |
| Production Example x-4 | 0.13 0.01 | Rosin ester TF Styrene TF | 10.0 10.0 | 20.0 | 54.1 | Mixed solvent (2) | 30 |

Production Example f-1

(Preparation of Fine Particle Dispersion Liquid (f-1))

To 100 parts by mass (solid content: 34.0 parts by mass) of a mixed solution of toluene and ethyl acetate containing a solution (i) of an acrylic resin containing the aforementioned acrylic resin (x-i) (an acrylic copolymer having structural units derived from butyl acrylate (BA) and acrylic acid (AA), BA/AA=90/10 (% by mass), Mw: 630,000) and having a solid concentration of 34.0% by mass, 51.0 parts by mass (solid content: 51.0 parts by mass) of silica particles (a product name: "Nipsil E-200A", manufactured by Tosoh Silica Corporation, volume average secondary particle diameter: 3 m) as fine particles and toluene were added, and the fine particles were dispersed, thereby preparing a fine particle dispersion liquid (f-1) having a solid concentration of 27% by mass containing the acrylic resin and the silica particles.

Production Example f-2

(Preparation of Fine Particle Dispersion Liquid (f-2))

In place of the solution (i), to 100 parts by mass (solid content: 37.0 parts by mass) of a mixed solution of toluene and ethyl acetate containing a solution (ii) of an acrylic resin containing the aforementioned acrylic resin (x-ii) (an acrylic copolymer having structural units derived from butyl acrylate (BA) and acrylic acid (AA), BA/AA=90/10 (% by mass), Mw: 470,000) and having a solid concentration of 37.0% by mass, 55.5 parts by mass (solid content: 55.5 parts by mass) of silica particles (a product name: "Nipsil E-200A", manufactured by Tosoh Silica Corporation, volume average secondary particle diameter: 3 m) as fine particles and toluene were added, and the fine particles were dispersed, thereby preparing a fine particle dispersion liquid (f-2) having a solid concentration of 30% by mass containing the acrylic resin and the silica particles.

Production Examples y-1 to y-2

(Preparation of Coating Liquids (y-1) to (y-2) for Forming Coating film (y'))

A fine particle dispersion liquid, a solution of an acrylic resin, a crosslinking agent, and a diluent solvent, each having the kind and blending amount shown in Table 2, were added, thereby preparing each of coating liquids (y-1) to (y-2) for forming a coating film (y') having a solid concentration shown in Table 2.

The details of the respective components shown in Table 2 used for the preparation of the coating liquids (y-1) to (y-2) for forming a coating film (y') are as follows.

<Fine Particle Dispersion Liquid>

Dispersion liquid (f-1): A fine particle dispersion liquid (f-1) containing the acrylic resin (x-i) and the silica particles and having a solid concentration of 27% by mass, as prepared in Production Example f-1.

Dispersion liquid (f-2): A fine particle dispersion liquid (f-2) containing the acrylic resin (x-ii) and the silica particles and having a solid concentration of 30% by mass, as prepared in Production Example f-2.

<Solution of Acrylic Resin>

Solution (i): A mixed solution of toluene and ethyl acetate containing an acrylic resin (x-i) (an acrylic copolymer having structural units derived from raw material monomers, BA/AA=90/10 (% by mass), Mw: 630,000) having a solid concentration of 34.0% by mass.

Solution (ii): A mixed solution of toluene and ethyl acetate containing an acrylic resin (x-ii) (an acrylic copolymer having structural units derived from raw material monomers, BA/AA=90/10 (% by mass), Mw: 470,000) having a solid concentration of 37.0% by mass.

<Crosslinking Agent>

Al crosslinking agent: Product name "M-5A", manufactured by Soken Chemical & Engineering Co., Ltd., aluminum chelate crosslinking agent, solid concentration: 4.95% by mass Epoxy crosslinking agent: A solution of an epoxy crosslinking agent obtained by diluting "TETRAD-C" (a product name, manufactured by Mitsubishi Gas Chemical Co., Inc.) with toluene to make a solid concentration of 5% by mass <Diluent Solvent>

IPA/CHN: A mixed solvent of isopropyl alcohol (IPA) and cyclohexanone (CHN) (IPA/CHN=95/5 (mass ratio))

TABLE 2

| | Coating liquid for forming coating film (y') | Fine particle dispersion liquid | | | | Solution of acrylic resin | | | |
|---|---|---|---|---|---|---|---|---|---|
| | | Kind | Blending amount (parts by mass) | Blending amount of solid (parts by mass) | Content (*) of fine particles (parts by mass) | Kind | Kind of resin | Blending amount (parts by mass) | Blending amount of solid (parts by mass) |
| Production Example y-1 | (y-1) | Dispersion liquid (f-1) | 73.1 | 19.7 | 11.8 | Solution (i) | Acrylic resin (x-i) [BA/AA = 90/10 (wt %), Mw = 630,000] | 26.9 | 9.1 |

TABLE 2-continued

| | | | | | | | | Concentration (**) of fine particles in solid of coating solution (mass %) |
|---|---|---|---|---|---|---|---|---|
| Production Example y-2 | Dispersion liquid (f-2) | 69.7 | 20.9 | 12.5 | Solution (ii) | Acrylic resin (x-ii) [BA/AA = 90/10 (wt %), Mw = 470,000] | 18.5 | 6.8 |

| | | Crosslinking agent | | | | | |
|---|---|---|---|---|---|---|---|
| | | Kind | Blending amount (parts by mass) | Blending amount of solid (parts by mass) | Blending amount of solid relative to 100 parts by mass of resin (parts by mass) | Diluent solvent Kind | Solid concentration of coating liquid (mass %) |
| Production Example y-1 | | Al crosslinking agent | 2.67 | 0.13 | 0.78 | IPA/ CHN | 24 |
| | | Epoxy crosslinking agent | 0.40 | 0.02 | 0.12 | | |
| Production Example y-2 | | Al crosslinking agent | 5.25 | 0.26 | 1.71 | IPA/ CHN | 24 |

(*) Content of fine particles in fine particle dispersion liquid: (y-1) is concerned with a value calculated from {[blending amount of solid] × 51.0/(34.0 + 51.0)}; and (y-2) is concerned with a value calculated from {[blending amount of solid] × 55.5/(37.0 + 55.5)}.
(**) Concentration of fine particles in solid of coating solution: A value calculated from {[content of fine particles]/([blending amount of solid in fine particle dispersion liquid] + [blending amount of solid of acrylic resin] + [blending amount of solid of crosslinking agent]) × 100}.

Examples 1 to 2

(1) Formation of Coating Film

On a release agent layer of a release film (manufactured by Lintec Corporation, a product name: "SP-PET381031", thickness: 38 μm, a PET film having a silicone release agent layer provided on one surface thereof) that is a first release material, the solution (xβ-1) of the resin composition prepared in Production Example x-1, the coating liquid (y-1) for forming the coating film (y') prepared in Production Example y-1, and the solution (xβ-1) of the resin composition for forming the coating film (xα') prepared in Production Example x-1 were simultaneously coated in this order from the upper portion of the release agent layer with a multilayer die coater (width: 250 mm), thereby simultaneously forming a coating film (xβ'), a coating film (y'), and a coating film (xα') in this order.

The coating speed of each of the solutions (coating liquids) for forming the coating film (xβ'), the coating film (y'), and the coating film (xα') and the coating amount of each of the coating films are shown in Table 3.

(2) Drying Treatment

The three layers of the coating film (xβ'), the coating film (y'), and the coating film (xα') were simultaneously dried at a drying temperature of 100° C. for 2 minutes, thereby forming a resin layer containing a resin part (X) and a particle part (Y) having the thickness shown in Table 3.

In all of Examples 1 to 2, plural concave portions and flat faces were also confirmed on the surface (α) of the formed resin layer through visual inspection.

(3) Production of Pressure Sensitive Adhesive Sheet without Substrate and Pressure Sensitive Adhesive Sheet with Substrate Lamination was performed in such a manner that the surface (α) of the formed resin layer was attached to a surface of a release agent layer of a release film (manufactured by Lintec Corporation, a product name: "SP-PET386040") that is a second release material, thereby producing a pressure sensitive adhesive sheet without a substrate.

After allowing the aforementioned pressure sensitive adhesive sheet without a substrate as similarly produced to stand under an environment at 23° C. for one week, the first release material was removed, and lamination was performed in such a manner that the exposed surface (β) of the resin layer was attached to a polyethylene terephthalate (PET) film (manufactured by Toray Industries, Inc., a product name: "Lumirror T60 #50", thickness: 50 m) that is a substrate, thereby producing a pressure sensitive adhesive sheet with a substrate.

Examples 3 to 4

(1) Formation of Coating Film

On a surface of a polyethylene terephthalate (PET) film having an aluminum vapor deposition layer on one surface thereof (manufactured by Lintec Corporation, a product name: "FNS MAT N50", thickness: 50 m), the solution (xβ-2) of the resin composition prepared in Production Example x-2, the coating liquid (y-2) for forming the coating film (y') prepared in Production Example y-2, and the solution (xα-1) or (xα-2) of the resin composition prepared in Production Example x-3 or x-4 were simultaneously coated in this order from the upper portion of the aluminum vapor deposition layer with a multilayer die coater (width: 250 mm), thereby simultaneously forming a coating film (xβ'), a coating film (y'), and a coating film (xα') in this order.

The coating speed of each of the solutions (coating liquids) for forming the coating film (xβ'), the coating film (y'), and the coating film (xα') and the coating amount of each of the coating films are shown in Table 3.

(2) Drying Treatment

The three layers of the coating film (xβ'), the coating film (y'), and the coating film (xα') were simultaneously dried at a drying temperature of 100° C. for 2 minutes, thereby forming a resin layer containing a resin part (X) and a particle part (Y) having the thickness shown in Table 3.

In all of Examples 3 to 4, plural concave portions and flat faces were also confirmed on the surface (α) of the formed resin layer through visual inspection.

(3) Production of Pressure Sensitive Adhesive Sheet with Substrate

Lamination was performed in such a manner that the surface (α) of the formed resin layer was attached to a surface of a release agent layer of a release film (manufactured by Lintec Corporation, a product name: "SP-PET381031"), thereby producing a pressure sensitive adhesive sheet with a substrate.

TABLE 3

|  | Coating speed (m/min) | Coating amount of coating film (g/m²) | | | Coating film Kind of (xβ') | Coating film (y') | | Coating film Kind of (xα') | Thickness of resin layer (μm) |
|  |  | Coating film (xβ') | Coating film (y') | Coating film (xα') | Kind of coating solution | Kind of coating liquid | Concentration of fine particles in coating film (y') (mass %) | | |
|---|---|---|---|---|---|---|---|---|---|
| Example 1 | 5.0 | 43.7 | 35.0 | 55.0 | (xβ-1) | (y-1) | 41 | (xβ-1) | 32 |
| Example 2 | 5.0 | 54.2 | 50.0 | 55.0 | (xβ-1) | (y-1) | 41 | (xβ-1) | 38 |
| Example 3 | 5.0 | 26.7 | 50.0 | 52.0 | (xβ-2) | (y-2) | 45 | (xα-1) | 34 |
| Example 4 | 5.0 | 27.0 | 48.2 | 56.2 | (xβ-2) | (y-2) | 45 | (xα-2) | 35 |

The pressure sensitive adhesive sheets with a substrates or the pressure sensitive adhesive sheets without a substrate produced in Examples 1 to 4 were subjected to the following measurement and evaluation. The results are shown in Table 4.

<Variation of Thicknesses of Layers in Horizontal Direction from 0 μm to 250 μm>

(1) Production of Measurement Specimen

The release material was removed from the pressure sensitive adhesive sheet with a substrate produced in Examples to expose the surface (a), thereby providing a measurement specimen.

(2) Imaging Device for Cross Section Image of Resin Layer and Measurement Condition As shown in FIG. 2, the region (P) surrounded by a square 50 having an edge length of 5 mm was freely-selected on the surface (a) 12a of the resin layer 12 of the measurement specimen.

The pressure sensitive adhesive sheet was cut in the thickness direction with planar surfaces that passed through two diagonal lines 51 and 52 of the square 50 of the region (P) respectively and were perpendicular to the region (P) on the surface (a) 12a, so as to provide two cross sections 61 and 62, one of which was selected.

Then, on the selected cross section, as shown in FIG. 3, a "width of 250 μm in the horizontal direction" with a distance between the start point S0 and the end point S250 of 250 μm was freely-selected, and the "width of 250 μm in the horizontal direction", which was the range 70 of the cross section including the width of 250 μm in the horizontal direction was observed with a scanning electron microscope ("S-4700", a product name, produced by Hitachi, Ltd.) under condition of an acceleration voltage of 5 kV and a magnification of 500, so as to provide a digital image (JPEG image) of the cross section.

(3) Calculation of Thickness of Layer

The resulting digital image (JPEG image) of the cross section was converted to a ternarized grayscale image with an image editing and processing software "GIMP" (free software), and further converted for image format to a PNM format (file descriptor: P2, type: portable grayscale, encoding: ASCII), i.e., converted to a character string corresponding to the respective pixels of the image.

The resulting character string was arranged to the same matrix as the original image in JPEG format with a text editor "Hidemaru Editor" (produced by Saito Kikaku Corporation), so as to provide a file in CSV format retaining the color information at the same positions as the pixels of the digital image of the cross section.

The thickness of the layer (Xα), the layer (Y1), or the layer (Xβ) at positions with a horizontal distance being made to vary from 0 μm to 250 μm was converted into numerical values based on the number of character strings corresponding to the layer (any of the layer (Xα), the layer (Y1), and the layer (Xβ)) and the value of the total thickness of the resin layer measured by the aforementioned method by utilizing functions of a spreadsheet software "Microsoft Excel" (produced by Microsoft Corporation), and thereby the relationship between the horizontal distance and the thickness of the layer was shown as a graph. The difference between the maximum value and the minimum value of the thickness of the layer, the standard deviation with respect to the average value, and the arithmetic average value Ra of the thickness of the layer (Y1) were calculated.

The number of the "range" defined in the aforementioned requirement (III) was calculated from the graph showing the variation of the thickness of the layer (Y1) at positions with a horizontal distance being made to vary from 0 μm to 250 μm of the pressure sensitive adhesive sheets of Examples.

<Mass Retention Rate of Resin Layer of Pressure Sensitive Adhesive Sheet>

The resin layer alone was obtained from the pressure sensitive adhesive sheet, and the mass of the resin layer before heating was measured. The resin layer was placed in a muffle furnace ("KDF-P90", a product name, produced by Denken Co., Ltd.) and heated to 800° C. for 30 minutes. The mass of the resin layer after heating was measured, and the mass retention rate of the resin layer was calculated by the following expression. The values are shown in Table 4.

(Mass retention rate of resin layer (%))=((mass of resin layer after heating)/(mass of resin layer before heating))×100

<Pressure Sensitive Adhesive Strength>

The pressure sensitive adhesive sheet with a substrate produced in Examples was cut into a size of 25 mm in length×300 mm in width, and then the surface (α) of the resin layer of the pressure sensitive adhesive sheet was adhered to a stainless steel plate (SUS304, polished with #360 polishing paper) under an environment of 23° C. and 50% RH (relative humidity), and allowed to stand in the same environment for 24 hours. After standing, the pressure sensitive adhesive strength of the pressure sensitive adhesive sheet was measured according to JIS Z0237:2000 by a 180° peeling method at a peeling speed of 300 mm/min.

<Interlayer Strength Test>

The pressure sensitive adhesive sheet with a substrate produced in Examples was cut into a size of 25 mm in length×300 mm in width, and then the surface (α) of the resin layer of the pressure sensitive adhesive sheet was adhered to a primer layer of a stainless steel plate (SUS304, polished with #360 polishing paper) having the primer layer on the surface thereof, under an environment of 23° C. and 50% RH (relative humidity), and allowed to stand in the same environment for 5 minutes.

The primer layer was formed in such a manner that a solution of an amino group-containing acrylic polymer ("Polyment NK-350", a product name, solid content: 33 to 37% by mass, produced by Nippon Shokubai Co., Ltd.) diluted with a mixed solvent of toluene and IPA (7/3) to have a solid concentration of 2% by mass was coated on the surface of the stainless steel plate with a brush, and the coating film was dried at 50° C. for 2 minutes.

After standing, the pressure sensitive adhesive sheet with a substrate was peeled from the stainless steel plate according to JIS Z0237:2000 by a 180° peeling method at a peeling speed of 300 mm/min, and then the adherend and the pressure sensitive adhesive sheet were visually observed to evaluate the interlayer strength of the pressure sensitive adhesive sheet by the following standard.

A: The pressure sensitive adhesive sheet was peeled at a position other than between the layers of the resin layer.

F: Breakage was confirmed between the layers of the resin layer.

layer (Xβ) at positions with a horizontal distance being made to vary from 0 μm to 250 μm in Examples 2 to 4.

FIG. 5 is a graph, which is extracted from the graph showing the variations of the thicknesses of the layers in FIG. 4, showing only the graph of the thickness of the layer (Y1) at positions with a horizontal distance being made to vary from 0 μm to 250 μm in a range of 250 μm in a horizontal direction freely-selected on the cross section (P1). It is understood from the graph that the four ranges that satisfy the requirement (III) exist in the pressure sensitive adhesive sheet of Example 1.

In addition, it was also confirmed that as described in the requirement (IV), a concave portion exists on the surface (α) of the layer (Xα) laminated vertically above the position in the layer (Y1), at which the thickness of the layer (Y1) is the minimum value ($H_{MIN}$(Y1)).

Figure 6:
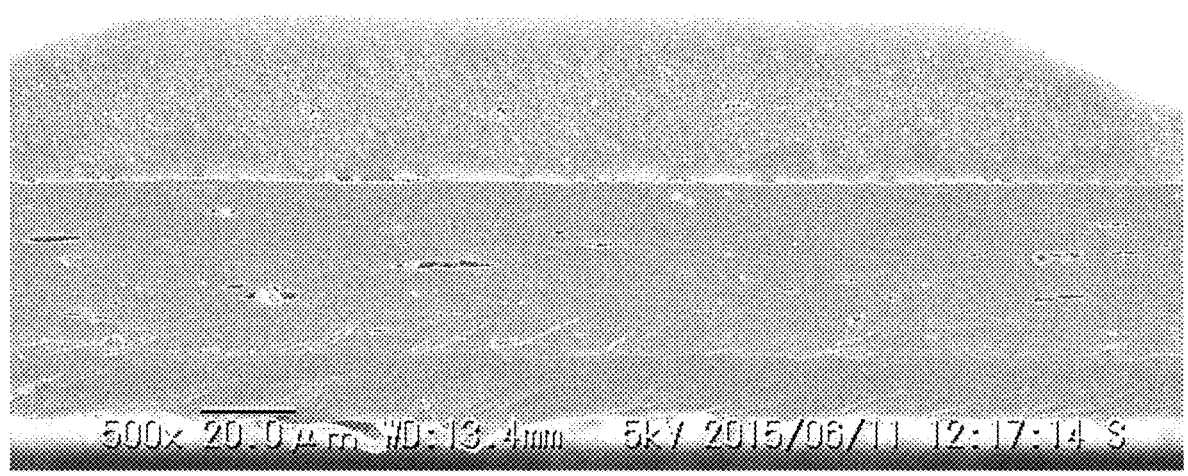
FIG. 6 is a cross sectional image acquired by observing a cross section of the pressure sensitive adhesive sheet produced in Example 1 with a scanning electron microscope.

Furthermore, FIG. 6 is a cross sectional image acquired by observing the cross section of the pressure sensitive adhesive sheet produced in Example 1 with a scanning electron microscope. The similar layer structures as the cross sectional image of FIG. 6 were obtained for the cross sections of the pressure sensitive adhesive sheets of Examples 2 to 4.

INDUSTRIAL APPLICABILITY

The pressure sensitive adhesive sheet of one embodiment of the present invention is useful as a pressure sensitive adhesive sheet having a large adhesive area that is used for

TABLE 4

| | Thickness of layer with horizontal distance made to vary from 0 to 250 μm | | | | | | Mass retention rate of resin layer | | |
|---|---|---|---|---|---|---|---|---|---|
| | Difference between maximum value and minimum value of thickness of layer (μm) | | | Standard deviation of thickness of layer with respect to average value (μm) | | | Number of range | of pressure sensitive | Pressure sensitive | Inter- |
| | Later (Xα) Requirement (Xα-I) | Layer (Y1) Requirement (Y1-I) | Layer (Yβ) Requirement (Xβ-I) | Later (Xα) Requirement (Xα-II) | Layer (Y1) Requirement (Y1-II) | Layer (Yβ) Requirement (Xβ-II) | defined in requirement (III) | adhesive sheet (%) | adhesive strength (N/25 mm) | layer strength test |
| Example 1 | 10.24 | 12.94 | 11.20 | 1.70 | 2.95 | 2.20 | 4 | 9.80 | 16.5 | A |
| Example 2 | 13.30 | 20.37 | 12.47 | 2.35 | 4.12 | 2.57 | 3 | 10.50 | 13.7 | A |
| Example 3 | 11.45 | 19.83 | 11.45 | 2.08 | 3.67 | 2.56 | 4 | 11.00 | 13.5 | A |
| Example 4 | 8.47 | 14.88 | 9.42 | 1.87 | 3.44 | 2.32 | 4 | 10.60 | 14.5 | A |

As shown in Table 4, such results were obtained that the pressure sensitive adhesive sheets produced in Examples 1 to 4 had excellent pressure sensitive adhesive strength and were excellent in interlayer adhesion between the adjacent two layers of the resin layer as a multilayer structure.

On the surface (α) of the resin layer of the pressure sensitive adhesive sheets produced in Examples 1 to 4, concave portions having an irregular shape and flat faces having an irregular shape that were visually recognized were confirmed.

FIG. 4 is a graph showing the thicknesses of the layer (Xα), the layer (Y1), and the layer (Xβ) at positions with a horizontal distance being made to vary from 0 μm to 250 μm in a range of 250 μm in the horizontal direction freely-selected on the cross section (P1) of the resin layer of the pressure sensitive adhesive sheet produced in Example 1. It is understood from the graph shown in FIG. 4 that there are large differences between the maximum value and the minimum value of the thickness of the layers.

The similar results were obtained in the graphs showing the thicknesses of the layer (Xα), the layer (Y1), and the identification or decoration, masking in coating, and surface protection for metal plates, and the like.

REFERENCE SIGN LIST 1a, 11a, 1b, 2a, 2b: Pressure sensitive adhesive sheet
11: Substrate
12: Resin layer
12a: Surface (α)
12b: Surface (β)
(X): Resin part (X)
(Y): Particle part (Y)
13: Concave portion
14: Flat face
21, 22: Release material
50: Square
51, 52: Diagonal line
61, 62: Cross section
70: Range

The invention claimed is:

1. A pressure sensitive adhesive sheet, comprising:
   a substrate or a release material;
   a resin layer on the substrate or the release material, the resin layer having a multilayered structure comprising a layer (Xβ), a layer (Y1), and a layer (Xα) laminated in this order,
   wherein
   at least a surface (α) of the layer (Xα) of the resin layer has pressure sensitive adhesiveness,
   the layer (Y1) comprises a constitutional component different from a constitutional component in the layer (Xα) and a constitutional component in the layer (Xβ), and
   when a 5 mm×5 mm square region (P) is randomly selected on the surface (α) and the pressure sensitive adhesive sheet is cut along each of two diagonal lines of the region (P) in a thickness direction perpendicular to the region (P) on the surface (α) to expose two cross sections of the pressure sensitive adhesive sheet, and a region having a width of 250 μm in a horizontal direction is randomly selected on at least one cross section (P1) of the two cross sections, a thickness of the layer (Xα) and a thickness of the layer (Y1) in the cross section (P1) satisfy (Xα-I) and (Y1-I):
   (Xα-I): a difference [$H_{MAX}(X\alpha) - H_{MIN}(X\alpha)$] between a maximum value ($H_{MAX}(X\alpha)$) of the thickness of the layer (Xα) and a minimum value ($H_{MIN}(X\alpha)$) of the thickness of the layer (Xα) is 3.00 μm or more, and
   (Y1-I): a difference [$H_{MAX}(Y1) - H_{MIN}(Y1)$] between a maximum value ($H_{MAX}(Y1)$) of the thickness of the layer (Y1) and a minimum value ($H_{MIN}(Y1)$) of the thickness of the layer (Y1) is 5.00 μm or more.

2. The pressure sensitive adhesive sheet according to claim 1, wherein
   the resin layer comprises a resin part (X) comprising a resin and a particle part (Y) consisting of particles,
   the layer (Xβ) mainly comprises the resin part (X),
   the layer (Y1) comprises the particle part (Y), and
   the layer (Xα) mainly comprises the resin part (X).

3. The pressure sensitive adhesive sheet according to claim 1, wherein the thickness of the layer (Xα) and the thickness of the layer (Y1) in the region having the width of 250 μm on the cross section (P1) further satisfy (Xα-II) and (Y1-II):
   (Xα-II): a standard deviation of the thickness of the layer (Xα) with respect to an average value is 1.00 or more, and
   (Y1-II): a standard deviation of the thickness of the layer (Y1) with respect to an average value is 2.00 or more.

4. The pressure sensitive adhesive sheet according to claim 1, wherein a thickness of the layer (Xβ) in the region having the width of 250 μm on the cross section (P1) satisfies (Xβ-I):
   (Xβ-I): a difference [$H_{MAX}(X\beta) - H_{MIN}(X\beta)$] between a maximum value ($H_{MAX}(X\beta)$) of the thickness of the layer (Xβ) and a minimum value ($H_{MIN}(X\beta)$) of the thickness of the layer (Xβ) is 3.00 μm or more.

5. The pressure sensitive adhesive sheet according to claim 1, wherein a thickness of the layer (Xβ) in the region having the width of 250 μm on the cross section (P1) satisfies (Xβ-II):
   (Xβ-II): a standard deviation of the thickness of the layer (Xβ) with respect to an average value is 1.00 or more.

6. The pressure sensitive adhesive sheet according to claim 1, wherein in a graph showing the thickness of the layer (Y1) at positions varying from 0 μm to 250 μm along the horizontal direction in the region having the width of 250 μm on the cross section (P1), at least one range including a maximum value (Q) satisfying (III) exists:
   (III): in the at least one range in the graph, along the horizontal direction, the thickness of the layer (Y1) exceeds Ra (μm), subsequently exceeds Ra+3 (μm) to reach the maximum value (Q), then underruns Ra+3 (μm), and further underruns Ra (μm),
   wherein Ra (μm) is an arithmetic average value of the thickness of the layer (Y1) in the region.

7. The pressure sensitive adhesive sheet according to claim 1, wherein in the region having the width of 250 μm on the cross section (P1), the surface (α) of the layer (Xα) has a concave portion at a position vertically above a position at which the layer (Y1) has the minimum value ($H_{MIN}(Y1)$) of the thickness.

8. The pressure sensitive adhesive sheet according to claim 2, wherein a mass retention rate after heating the resin layer at 800° C. for 30 minutes is 3 to 90% by mass.

9. The pressure sensitive adhesive sheet according to claim 2, wherein the resin included in the resin part (X) comprises a pressure sensitive adhesive resin.

10. The pressure sensitive adhesive sheet according to claim 2, wherein the resin part (X) further comprises at least one crosslinking agent selected from the group consisting of a metal chelate crosslinking agent and an epoxy crosslinking agent.

11. The pressure sensitive adhesive sheet according to claim 2, wherein the particles are at least one selected from the group consisting of silica particles, metal oxide particles, and smectite.

12. The pressure sensitive adhesive sheet according to claim 1, wherein a surface (β) of the resin layer on a side on which the substrate or the release material is provided has pressure sensitive adhesiveness.

13. The pressure sensitive adhesive sheet according to claim 1, wherein
   the layer (Xβ) is formed from a composition (xβ) comprising a resin and less than 15% by mass of fine particles,
   the layer (Y1) is formed from a composition (y) comprising 15% by mass or more of fine particles, and
   the layer (Xα) formed from a composition (xα) comprising a resin and less than 15% by mass of fine particles.

14. The pressure sensitive adhesive sheet according to claim 1, wherein
   the resin layer has a thickness of 10 to 75 μm,
   the difference [$H_{MAX}(X\alpha) - H_{MIN}(X\alpha)$] in the (Xα-I) is 8.00 μm or more, and
   the difference [$H_{MAX}(Y1) - H_{MIN}(Y1)$] in the (Y1-I) is 9.00 μm or more.

15. A method for producing the pressure sensitive adhesive sheet according to claim 1, the method comprising:
   laminating, on the substrate or the release material, a coating film (xβ') formed by a composition (xβ) comprising a resin and less than 15% by mass of fine particles, a coating film (y') formed by a composition (y) comprising 15% by mass or more of fine particles, and a coating film (xα') formed by a composition (xα) comprising a resin and less than 15% by mass of fine particles, in this order, and
   simultaneously drying the coating film (xβ'), the coating film (y'), and the coating film (xα'), such that the layer (Xβ) is formed from the coating film (xβ'), the layer (Y1) is formed from the coating film (y'), and the layer (Xα) is formed from the coating film (xα').

16. A method for producing the pressure sensitive adhesive sheet according to claim 1, the method comprising:
- laminating, on the layer (Xβ) provided on the substrate or the release material, a coating film (y') formed by a composition (y) comprising 15% by mass or more of fine particles and a coating film (xα') formed by a composition (xα) comprising a resin and less than 15% by mass of fine particles in this order, and
- simultaneously drying the coating film (y') and the coating film (xα') such that the layer (Y1) is formed from the coating film (y') and the layer (Xα) is formed from the coating film (xα').

* * * * *